(12) United States Patent
Ciampaglia et al.

(10) Patent No.: US 12,248,605 B2
(45) Date of Patent: Mar. 11, 2025

(54) STORING, READING, AND ENCRYPTING PERSONAL IDENTIFIABLE INFORMATION

(71) Applicant: Ridgeline, Inc., Incline Village, NV (US)

(72) Inventors: Alex Daniel Ciampaglia, Incline Village, NV (US); Wen Jie Zhou, Brooklyn, NY (US)

(73) Assignee: Ridgeline, Inc., Incline Village, NV (US)

(*) Notice: Subject to any disclaimer, the term of this patent is extended or adjusted under 35 U.S.C. 154(b) by 170 days.

(21) Appl. No.: 17/701,504

(22) Filed: Mar. 22, 2022

(65) Prior Publication Data
US 2023/0090611 A1 Mar. 23, 2023

Related U.S. Application Data

(60) Provisional application No. 63/247,133, filed on Sep. 22, 2021.

(51) Int. Cl.
*G06F 21/60* (2013.01)
*G06F 21/62* (2013.01)
*H04L 9/08* (2006.01)

(52) U.S. Cl.
CPC .......... *G06F 21/6245* (2013.01); *G06F 21/60* (2013.01); *G06F 21/602* (2013.01); *H04L 9/0825* (2013.01); *H04L 9/088* (2013.01); *H04L 9/0822* (2013.01)

(58) Field of Classification Search
CPC .... G06F 21/6245; G06F 21/602; G06F 21/60; H04L 9/0822; H04L 9/0825; H04L 9/088
See application file for complete search history.

(56) References Cited

U.S. PATENT DOCUMENTS

| | | | |
|---|---|---|---|
| 11,182,635 B2 * | 11/2021 | Odate | G06V 30/153 |
| 11,816,103 B1 | 11/2023 | Goel | |
| 2007/0261114 A1 * | 11/2007 | Pomerantsev | G06F 16/9535 726/12 |
| 2010/0005509 A1 | 1/2010 | Peckover | |
| 2014/0115710 A1 | 4/2014 | Hughes | |
| 2017/0142082 A1 | 5/2017 | Qian | |
| 2019/0197217 A1 | 6/2019 | Donovan | |
| 2020/0125725 A1 | 4/2020 | Petersen | |

(Continued)

FOREIGN PATENT DOCUMENTS

| | | | | |
|---|---|---|---|---|
| CN | 111404662 A | * | 7/2020 | H04L 63/0442 |
| KR | 2013012136 A | * | 2/2013 | G06F 15/16 |

OTHER PUBLICATIONS

"Secrets and Personally Identifiable Information (PII) Across Our API Definitions"—API Evangelist, Jan. 27, 2020 https://apievangelist.com/2020/01/27/secrets-and-personally-identifiable-information-pii-across-our-api-definitions/ (Year: 2020).*

(Continued)

*Primary Examiner* — Randy A Scott
(74) *Attorney, Agent, or Firm* — Van Pelt, Yi & James LLP

(57) ABSTRACT

The present application discloses a method, system, and computer system for storing, reading and/or encrypting personal identifiable information (PII). The method includes obtaining PII data corresponding to a dataset, obtaining a PII key associated with the PII data, and storing, in the dataset, information pertaining to the PII key in association with the PII data.

21 Claims, 21 Drawing Sheets

(56) References Cited

U.S. PATENT DOCUMENTS

2020/0302082 A1    9/2020  Carteri
2020/0327540 A1*  10/2020  Chavarria ............ G06Q 20/389
2021/0182423 A1    6/2021  Padmanabhan
2022/0329413 A1   10/2022  Schindewolf
2023/0034426 A1    2/2023  Kati

OTHER PUBLICATIONS

"PII Encryption Requirements: Cheatsheet"—Cossack Labs, Apr. 2, 2020 https://www.cossacklabs.com/blog/pii-encryption-requirements-cheatsheet/ (Year: 2020).*

Author Unknown, "CryptDB", downloaded from <htttps://css.csail.mit.edu/cryptdb/> retrieved on Mar. 10, 2022.

Boneh et al., "Order-Revealing Encryption", retrieved from <https://crypto.stanford.edu/ore/> on Mar. 10, 2022.

* cited by examiner

| ACCOUNT NUMBER | FIRST NAME | LAST NAME | ADDRESS | SOCIAL SECURITY NUMBER (SSN) | EMPLOYER NAME | EMPLOYER ADDRESS | JOB TITLE | ANNUAL INCOME |
|---|---|---|---|---|---|---|---|---|
| 0012345 | Jane | Doe | 1 Apple Ave | 444-49-3945 | Acme Inc. | 43 Yong Street | General Counsel | $ 219,058.00 |
| 0023456 | John | Smith | 9 Halton Place | 498-58-6932 | Acme Ltd. | 26 Bathurst Street | Product Manager | $ 258,038.00 |
| 0034567 | Alex | Williams | 8 Main Street | 374-28-5028 | Acme Co. | 95 Spadina Ave | Engineer | $ 175,924.00 |
| 0045678 | Josh | Grad | 3 New Street | 857-24-3069 | Acme Inc. | 43 Yong Street | Marketing Manager | $ 139,048.00 |
| 0056789 | Elizabeth | Stewart | 7 Lakeshore Road | 384-84-9844 | Acme Co. | 95 Spadina Ave | CEO | $ 1,505,863.00 |

FIG. 3A

| ACCOUNT NUMBER | FIRST NAME | F_N PII KEY | F_N PII FLAG | LAST NAME | L_N PII KEY | L_N PII FLAG | ADDRESS | AD PII KEY |
|---|---|---|---|---|---|---|---|---|
| 0012345 | Jane | 43094 | Y | Doe | 43094 | Y | 1 Apple Ave | 43094 |
| 0023456 | John | 20958 | Y | Smith | 20958 | Y | | - |
| 0034567 | Alex | 21095 | Y | Williams | 21095 | Y | 8 Main Street | 21095 |
| 0045678 | Josh | 60206 | Y | Grad | 60206 | Y | 3 New Street | 60206 |
| 0056789 | Elizabeth | 20604 | Y | Stewart | 20604 | Y | | - |

FIG. 3B

| AD PII FLAG | SOCIAL SECURITY NUMBER (SSN) | SSN PII KEY | SSN PII FLAG | EMPLOYER NAME | EMPLOYER ADDRESS | JOB TITLE | ANNUAL INCOME |
|---|---|---|---|---|---|---|---|
| Y | 444-49-3945 | 43094 | Y | Acme Inc. | 43 Yong Street | General Counsel | $ 219,058.00 |
| N | 498-58-6932 | 20958 | Y | Acme Ltd. | 26 Bathurst Street | Product Manager | $ 258,038.00 |
| Y | 374-28-5028 | 21095 | Y | Acme Co. | 95 Spadina Ave | Engineer | $ 175,924.00 |
| Y | 857-24-3069 | 60206 | Y | Acme Inc. | 43 Yong Street | Marketing Manager | $ 139,048.00 |
| N | 384-84-9844 | 20604 | Y | Acme Co. | 95 Spadina Ave | CEO | $ 1,505,863.00 |

FIG. 3B (Cont.)

| L_N PII FLAG | ADDRESS | AD Field PII Indicator | AD PII KEY | AD PII FLAG | SOCIAL SECURITY NUMBER (SSN) | SSN Field PII Indicator | SSN PII KEY | SSN PII FLAG |
|---|---|---|---|---|---|---|---|---|
| Y | 1 Apple Ave | Y | 43094 | Y | 444-49-3945 | Y | 43094 | Y |
| Y | 10 Lakeshore Road | Y | 20958 | N | 498-58-6932 | Y | 20958 | Y |
| Y | 8 Main Street | Y | 21095 | Y | 374-28-5028 | Y | 21095 | Y |
| Y | 3 New Street | Y | 60206 | Y | 857-24-3069 | Y | 60206 | Y |
| Y | 25 Brant Street | Y | 20604 | N | 384-84-9844 | Y | 20604 | Y |

FIG. 3C (Cont.)

STORING, READING, AND ENCRYPTING PERSONAL IDENTIFIABLE INFORMATION

CROSS REFERENCE TO OTHER APPLICATIONS

This application claims priority to U.S. Provisional Patent Application No. 63/247,133 entitled PERSONAL IDENTIFIABLE INFORMATION HANDLING filed Sep. 22, 2021 which is incorporated herein by reference for all purposes.

BACKGROUND OF THE INVENTION

A system for big data processing comprises a system for receiving data, storing data, processing data, etc. Big data processing systems typically comprise a large number of elements in one or more datasets. The one or more data sets are accessed by users associated with an organization. The one or more datasets may include Personally Identifiable Information (PII) data for one or more individuals such as employees or customers of an organization, etc. At scale, the number of records comprised stored in the one or more datasets is very large. Recording PII data in a manner that facilitates a relatively quick search for PII data within the one or more datasets may be beneficial to create an audit log of PII data transactions, to comply with certain privacy laws or regulations, to delete PII data, to recover a dataset including PII data, etc.

BRIEF DESCRIPTION OF THE DRAWINGS

Various embodiments of the invention are disclosed in the following detailed description and the accompanying drawings.

FIG. 3A is a diagram of an example of a dataset according to various embodiments of the present application.

FIG. 3B is a diagram of an example of a dataset according to various embodiments of the present application.

DETAILED DESCRIPTION

Figure 1:
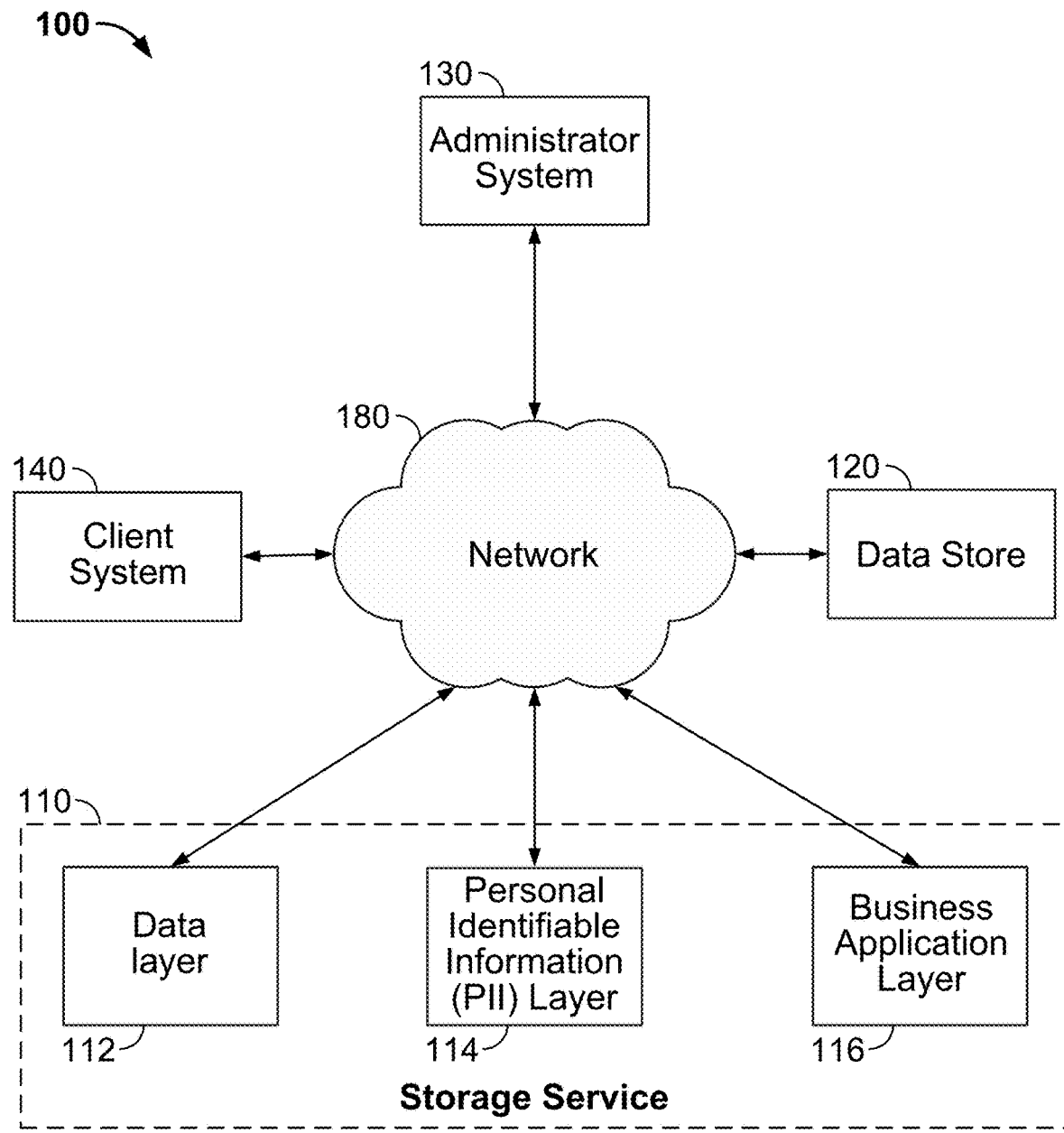
FIG. 1 is a block a diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, personally identifiable information (PII) (which may also be referred to as PII data) may comprise any data that could potentially be used to identify a particular person. Examples of PII include a portion of name or a full name (e.g., a first name, a middle name, a last name, etc.), address, Social Security number, a tax identification number, driver's license number, bank account number, passport number, email address, job title, race, cookies identifier, advertising identifier, tax identification numbers, date and place of birth, mother's maiden name, biometric records, information linked or linkable to an individual such as medical, educational, financial, and/or employment information, information that can identify an individual directly or indirectly, and the like. Examples of information that is not PII include identifiers that are not associated with a particular individual, anonymized or de-identified data, and the like. According to various embodiments, the metes and bounds of the definition of PII is based on definitions/ interpretations of laws, regulations, or rules promulgated in jurisdiction in which the system is deployed or in which individuals for whom PII is obtained, etc.

As used, a PII key may be an identifier associated with a user. The PII key may be a unique identifier (e.g., unique for a particular dataset, globally unique across the system, etc.). For example, the PII key is a universally unique identifier (UUID) such as UUID version 4, globally unique identifier (GUID), etc. The PII key may be comprised of a string of numbers, letters, special characters, or any combination thereof. The PII key may be randomly generated. In some embodiments, a PII key is associated with a single individual. In some embodiments, a PII key is associated with a set of individuals. In some embodiments, every individual that has the right to be forgotten has their own associated PII key for the system. The PII key may be generated by the system (e.g., when a new client is created) or obtained from client business logic. In some embodiments, when a data is stored in a field associated with a PII flag, the system stores an associated PII key with the data. In some embodiments, the system returns an error in response to no PII key being associated with the data being stored. In some embodiments, a storage system provides information (e.g., to an auditing/ tracking module) that a data has been stored associated with the given PII key for tracking/auditing purposes.

As used herein, a PII flag may be an indication that a corresponding element of a dataset (e.g., a record, a field, etc.) comprises PII data. For example, a first field comprises PII data, and a second field that is associated with the first field. The second field comprises information pertaining to a PII flag (e.g., a value/setting of the PII flag) and is set to indicate that the first field comprises PII data. In various embodiments, the system for handling PII data includes a storage system for storing data in a storage location (e.g., a value for the data is stored in the storage location which may or may not include PII data), a storage system for storing a flag indicating that PII data is stored in the storage location (e.g., a flag set to a value such as "is_PII" or "is_not_PII" is stored associated with the data that indicates that the data stored in the storage location is identified as being PII for the system), a storage system for storing metadata associated with the stored data (e.g., where the metadata comprises one or more of the following: an encryption key, a location where an encryption key is stored, a storage date, a source associated with the data, a PII identifier which comprises an identifier associated with a user, client, or owner of the data for tracking PII associated with the user, client, or owner, or any other appropriate metadata), or any other appropriate type of stored data. In various embodiments, the storage system stores a first field, a second field, and/or a third field associated with storing PII data, or any other appropriate field. In various embodiments, the first field, the second field, and/or the third field store one or more of a data value (e.g., a value for the data is stored in the storage location which may or may not include PII data), a flag (e.g., a flag set to a value such as "is_PII" or "is_not_PII" is stored associated with the data that indicates that the data stored in the storage location is identified as being PII for the system), and/or metadata (e.g., where the metadata comprises one or more of the following: an encryption key, a location where an encryption key is stored, a storage date, a source associated with the data, a PII identifier which comprises an identifier associated with a user, client, or owner of the data for tracking PII associated with the user, client, or owner, or any other appropriate metadata), and/or any other appropriate data.

Various jurisdictions around the world are passing law and regulations pertaining to the privacy of individuals. These privacy laws and regulations empower people to have greater control over the use and storage of their associated PII. In some jurisdictions, some privacy laws and regulations (e.g., laws such as the Global Data Protection Regulation (GDPR) and the California Consumer Privacy Act (CCA)) provide an individual with the right to require others to delete PII data associated with themselves. In order to comply with these privacy laws and regulations, companies that provide services which store PII data are attempting to find mechanisms to delete PII data in response to receiving requests from users of such services. Currently, related art systems primarily rely on manual search and delete of applicable PII. For example, in response to receiving a request from an individual named John Smith, related art systems perform a search across their corresponding datasets for the name John Smith. Of course, such a search across the dataset is likely to return numerous results, many of which may pertain to other individuals having the same name. Related art systems then typically rely on manual filtering of the search results to identify the subset of results actually pertaining to the individual associated with the request. However, at scale such manual systems are cumbersome and inefficient. Accordingly, there is a need for systems or mechanisms for tracking PII data that is stored to a system (e.g., in connection with a service), for receiving requests to delete or identify stored PII, and/or for identifying PII data and deleting the PII data from storage.

According to various embodiments, a system, method, and/or device for storing and/or managing PII data is disclosed. The system comprises one or more processors and a memory. The one or more processors are configured to obtain PII data corresponding to a dataset, obtain a PII key associated with the PII data, and store, in a dataset, the PII data and the PII key, wherein the PII key is associated with the PII data.

According to various embodiments, a system, method, and/or device for searching for PII data in a dataset is disclosed. The system comprises one or more processors and a memory. The one or more processors are configured to obtain an indication to identify (e.g., determine, locate, etc.) PII data for an individual(s), to obtain a PII key(s) associated with the individual(s), perform a search against the dataset for information matching the PII key(s) associated with the individual(s), and provide a set of results corresponding to records (or PII data comprised in the record) for which the associated PII key(s) match the PII key(s) associated with the individual(s). In some embodiments, performing the search against the dataset comprises obtaining a subset of the dataset (e.g., a subset of the records of the dataset) comprising PII data, and searching the subset of the dataset comprising PII data for information matching the PII key(s) associated with the individual(s). As an example, the obtaining a subset of the dataset (e.g., a subset of the records of the dataset) comprises filtering the dataset based on an indicator (e.g., a PII flag) indicating that an element of the dataset (e.g., a record, a field, etc.) comprises PII data. The indicator (e.g., the PII flag) may be set contemporaneous with the storing of the corresponding element. For example, at a time that a record or information in a field is stored, the system determines whether the record or the information in the field being stored comprises PII data, and correspondingly sets the indicator (e.g., a field designated as a PII flag, etc.).

According to various embodiments, a system, method, and/or device for deleting PII data from a dataset is disclosed. The system comprises one or more processors and a memory. The one or more processors are configured to determine to delete from a dataset PII data corresponding to an individual, determine a PII key associated with the individual, and perform a lookup with respect to the dataset for PII data associated with the individual using the PII key.

According to various embodiments, a system, method, and/or device for recovering a dataset including PII data disclosed. The system comprises one or more processors and a memory. The one or more processors are configured to (i) obtain an indication that a dataset is to be recovered (e.g., an earlier version of the dataset is to be reconstructed, etc.), (ii) obtain an earlier version of the dataset, generate a reconstructed dataset, (iii) determine one or more actions/transactions committed to the dataset being recovered since a date of the earlier version, (iv) determine whether to commit to the reconstructed dataset at least one of the one or more actions/transactions committed to the dataset being recovered, and (v) in response to determining to commit to the reconstructed dataset at least one of the one or more actions/transactions, commit the at least one of the one or more actions/transactions. In some embodiments, the system stores information pertaining to an action/transaction to data stored in a dataset (e.g., requests, deletion of information, modification of information, etc.) in an audit log. The system can use the audit log to identify intervening requests.

In some embodiments, PII data (e.g., a record comprising PII, a data object comprising PII, etc.) has a plurality of associated identifiers, including an identifier that uniquely identifies the record/object, and an identifier that uniquely identifies a set of one or more individuals associated with the PII. For example, the PII data has two unique identifiers associated therewith—the identifier that uniquely identifies the record/object, and the PII key. Examples of the identifier that uniquely identifies the record/object include a row identifier (e.g., a row id of the table in which information comprising the PII data is stored), a data object identifier, etc. Various other types of identifiers may be implemented. An example of the identifier that uniquely identifies the set of one or more individuals associated with the PII data is the PII key.

In some embodiments, redaction of data is achieved upon request or indication by using either a person/user/client identifier or a unique PII identifier. In some embodiments, a person/user/client identifier is different from the unique PII identifier. In some embodiments, a PII cache is used to determine which storage locations, which microservices, which domain models, which fields in the models or objects of models, or any other locations include PII associated with the identifier (e.g., the unique PII identifier). In some embodiments, the fields storing the PII are redacted (e.g., deleted, obfuscated by losing an encryption key, moved to a separate system and stored, stored using a different encryption key, etc.).

In some embodiments, the PII key associated with a particular piece of information such as a record or data object is static, or a set of individuals associated with the PII data is static. Accordingly, if personal information for an individual (or set of individuals) changes in particular record or data object (e.g., if a name for an individual changes, an individual becomes married, etc.), the PII key remains the same for such individual and the corresponding record(s) or data object(s) remains associated with the PII key. The PII key thus tracks a user (or set of users) throughout the system. The identifier that uniquely identifies the record/object is generally generated based on a particular model. For example, the identifier that uniquely identifies the record/object is a row identifier of a table in a dataset, or a record identifier. However, if the data model is modified or changed (e.g., if the information comprised in the dataset is migrated to a different data model), then the integrity of the identifier uniquely identifying the record/object may be compromised or difficult to trace. The implementation of the PII key in association with PII data for a particular set of individuals may use PII data across various datasets within a system, thereby ensuring that referential integrity across an architecture (e.g., across the system) is maintained. According to various embodiments, even if the data model for the information changes, the PII key associated with a particular PII data item will remain applicable.

According to various embodiments, the system causes PII data to be associated with a PII key when the information is being stored in the dataset. For example, the system forces the application or other system attempting to store information deemed to be PII data to provide a corresponding PII key at the time such information is being stored. In some embodiments, the system forces the application or other system attempting to store information deemed to be PII data to provide at least one corresponding PII key when the PII data is being stored (e.g., a plurality of individuals may be associated with a particular PII data stored in an element). The system may restrict storing the PII data (e.g., to the particular element of the dataset such as a field or record) until the corresponding PII key (or identifier or location of the PII key) is provided. In some embodiments, the dataset is configured to indicate dataset elements that are intended or deemed to store PII. As an example, the indication of whether an element is intended or deemed to store PII data is defined at a class level such that every instance of the class will have the same indication of whether the element is intended or deemed to store PII. The indication of whether an element is intended or deemed to store PII data is configurable such as by a user (e.g., an administrator, a developer, etc.) or by the system based on a recommendation service (e.g., based on an analysis of information stored across the dataset such as via a machine learning process), etc. As an example, a developer provides an indication of the fields of a record, or the types of records in which PII data is to be stored. When the system attempts to write information to an element, the system determines whether the information is deemed to be PII. For example, the system can perform a lookup with respect to a mapping of elements to PII. As another example, with respect to a first element (e.g., field) deemed to include PII data, the dataset comprises another associated element (e.g., a second element such as an associated field corresponding to a client PII flag) indicating whether the first element is PII data (or is to be deemed PII). The second element may be set (or configurable) such as by a user or recommendation service.

The recommendation service may provide to a user or other system (e.g., a user or system/application associated with a client or customer of the system) a recommendation of certain element(s) that are deemed to correspond to PII, and in response to the user or other system validating the deeming of the element as PII, the system deems information stored (or to be stored) in the certain element(s) to be PII. For example, in response to receiving a validation from the user or other system, the system stores an indication(s) that the certain element(s) are intended to be stored as PII data (e.g., in the mapping of elements to PII, or in second element(s) respectively associated with the certain element(s)). An example of a recommendation that an element of a dataset being deemed PII data is in response to the system determining that a field is labeled (e.g., named or having associated metadata) as a social security number. In response to determining that the field is labeled as a social security number, the system determines that information stored in such a field is PII.

In some embodiments, the system comprises a configuration service that configures datasets for various applications (e.g., different instances for different customers, for different applications running on the system or other system such as a payroll application, a finance application, a customer relationship management system, etc.). The configuration service configures the datasets to indicate the set of elements comprised in the datasets that are PII data (or deemed to be PII). For example, the configuration service configures client PII flags for the set of elements comprised in the datasets that are PII data to indicate that such set of elements are PII data. As another example, in connection with configuring a dataset, the configuration service generates a mapping of elements of a dataset to an indication of whether the corresponding elements are PII data. In some embodiments, the configuration service comprises a baseline set of elements that are to be mapped to PII data (e.g., for which the client PII flag is to be set as indicating the element comprises PII data). The baseline set of elements that are to be mapped to PII data may override any indications provided by a client (e.g., a user or other system associated with the client) that an element comprised in the set of elements that are to be mapped to PII data. As an example, the baseline set of elements is not configurable by the client. An example of the application of the baseline set of elements that are to be mapped to PII data is in the context of a payroll system. The payroll system may have a corresponding dataset comprising employee information such as employee identifier, name, address, social security numbers, employee deductions, etc. If the baseline set of elements comprises name, address, and social security numbers, and the client attempts to configure the dataset such that only the field for social security numbers is indicated to be PII data, the configuration service overrides the client configuration with respect to the baseline set of elements. In some embodiments, the configuration service compares the set of elements for the dataset with the baseline set of elements that are to be mapped to PII data, and automatically forces the client PII flag to be set for elements of the dataset that are comprised in the baseline set of elements.

The system uses one or more of the plurality of identifiers in connection with searching for particular information (e.g., PII data for a particular person). In response to determining that a particular information is to be located, the system uses the identifier that uniquely identifies the record/object. For example, the identifier that uniquely identifies the record/object is a row id, and the system queries a table pertaining to a dataset for information comprised in the row of the table matching the row id. In response to determining that a particular PII data is to be located, the system uses the PII key to identify PII data comprised in the dataset (or plurality of datasets) matching the PII key. For example, the system filters the dataset according to PII key to return all results matching the PII key.

In some embodiments, the system uses the PII key to search for/identify PII data pertaining to a particular individual (or set of individuals). For example, the system queries the dataset for PII data matching the PII key (e.g., the PII key associated with a user that has requested corresponding PII data be deleted). As the system scales, the datasets become extremely large and querying the system with respect to all information within the dataset for PII data pertaining to a particular individual may become inefficient, and such querying repeated for several individuals becomes particularly inefficient. In some embodiments, a PII flag is used to track whether an element in the dataset (e.g., a record, a field, etc.) comprises PII data. The PII flag may be set at the time that information is stored in the element. For example, the system determines whether the information being stored in the element is PII data. The system may determine that the information being stored in the element is PII data based at least in part on an indication from another system (e.g., a client system, an application, etc.) from which the information is obtained for storage. In some embodiments, the system uses the PII flags for the elements comprised in the dataset for searching for PII data pertaining to one or more individuals. The system filters the dataset for a subset of elements (e.g., a subset of all records in the dataset, etc.) that respectively include PII data based at least in part on the corresponding PII flags set with respect to the elements. In other words, the system queries the dataset to return all information that includes the PII data (e.g., all information for which corresponding PII flags='yes' or 'true,' etc.). The subset of elements that respectively include PII data (also referred to herein as a PII dataset) is then used to search for particular information (e.g., elements) corresponding to a PII key(s) for a particular individual (or a set of individuals). The use of the PII flag to filter the dataset to those elements including PII data eliminates the need for the system to look at information (e.g., elements) that is not productive (e.g., elements the system does not need to look at because it does not comprise PII data). In response to obtaining the subset of elements that respectively includes PII data, the system queries such subset of elements for PII data pertaining to the one or more individuals for whom the system is searching (e.g., the set of persons that requested corresponding PII data to be deleted/forgotten).

According to various embodiments, the system stores a set of individuals for which the system has determined to delete/forget PII data. The system may determine to delete/forget PII data for an individual in response to receiving a request such as a request from an application or a client system or based at least in part on an information retention policy. As an example, the system comprises an interface via which a user requests deletion of particular PII data (e.g., PII data corresponding to the user or one or more other individuals). As an example, the system stores a mapping of individuals to indications of whether PII data is to be deleted or forgotten. As another example, the system stores a table or list of individuals for which the system has determined to delete the PII data. In response to receiving a request to delete PII data for a particular person, the system updates the list or mapping indicating the set of individuals for which PII data is to be deleted/forgotten. The system determines one or more individuals to be deleted/forgotten (e.g., based on a request from a user or other system, etc.), and the system correspondingly updates the list or mapping to include the determined one or more individuals to be deleted/forgotten. An example of the information retention policy includes purging PII data after a threshold period of time (e.g., a predefined retention period), such as a year after a particular element is stored in the dataset, etc. The threshold period of time for an information retention policy may be configurable, etc. In some embodiments, the information retention policy comprises a plurality of threshold periods of time for different jurisdictions in which individuals are located, or where the information is stored, etc.

In some embodiments, the system determines to perform a process to delete or forget PII data for a set of individuals. The system may determine to delete/forget particular PII data according to a predetermined schedule or in response to a determination that one or more predetermined conditions. For example, the system performs the process to delete or forget the PII data as a batch process. The system may query the dataset for PII data corresponding to individuals comprised on a list or mapping of individuals to be deleted/forgotten, and the system may perform the deletion/forgotten as a batch process. The predetermined schedule and/or one or more predetermined conditions may be configurable such as by a user or other system (e.g., a customer system, an administrator, etc.). Examples of the predetermined schedule includes daily, every other day, weekly, continuously, etc. Examples of predetermined conditions includes a threshold number of individuals on the list or mapping of individuals for which PII data is to be deleted/forgotten (e.g., when the list or mapping comprises at least the threshold number of individuals, the system determines to perform the process to delete or forget the PII data). In some embodiments, the system stores a mapping of individuals on the list or mapping of individuals for which PII data is to be deleted/forgotten and their association with PII keys.

Various different mechanisms for deleting or forgetting particular PII data can be implemented. The system may be configured: (i) to delete the PII data stored in a corresponding element (e.g., field) such as by replacing such element with a null value, (ii) to obscure the PII data with noise such as by replacing the PII data with a random string and/or by moving the PII data to a secure storage area (e.g., a trusted zone with heightened access restrictions), (iii) to delete an encryption key corresponding to the PII data (e.g., the encryption key mapped to the PII key), (iv) to replace the encryption key corresponding to the PII data with a random string or a null value, (v) to move the encryption key corresponding to the PII data to a secure storage area, or (vi) any combination of the foregoing. The foregoing mechanisms for deleting or forgetting particular PII data comply with current laws and regulations because such mechanisms, individually or in combination, prevent such data from being used for business processes and/or business analytics. In some embodiments, an encryption key identifier is used to look up an encryption key for PII.

In some embodiments, in response to determining to delete or forget PII data for a particular person, the system attempts to delete or forget the PII data a predetermined number of times (e.g., a threshold number of deletion attempts such as 5 sweeps or scans of the dataset) over a predetermined amount of time (e.g., a threshold deletion time such as a week, 3 weeks, a month, etc.), and/or a threshold number of sweeps with no action being taken with respect to information pertaining to a particular person, etc. In some embodiments, a first pass or attempt to delete or forget PII data for a particular person should handle the majority of the deletion. The use of the predetermined number of time or predetermined amount of time may be implemented to account for inflight requests that may write/update PII data in the dataset for particular person(s) contemporaneous with an attempt to delete or forget PII data for the particular individual if such a person is included in the list or mapping. A list or mapping of individuals for which PII data is to be deleted/forgotten may become burdensome if the list or mapping is not purged or updated to remove individuals that have been deleted/forgotten. The system may perform a predetermined number of scans of the dataset for PII data (e.g., a scan of the subset of elements that respectively include PII data) for a particular individual (e.g., an individual on the list or mapping). For example, in response to a determination that a particular individual has been included in the list or mapping used to identify and delete/forget PII data in the dataset for a threshold number of scans, the system updates the list or mapping to remove the person. In some implementations, the system may deem that the PII data for the particular individual has been deleted/forgotten after the threshold number of scans, and/or a predetermined threshold number of sweeps (e.g., sequential or consecutive sweeps) has been performed and no PII data for the particular individual has been found.

In some embodiments, the system implements a threshold shutdown time (e.g., according to a predetermined schedule) during which the system does not process requests that may impact information stored in the dataset and the system performs the process to delete or forget PII data during such threshold shutdown time. As an example, once a week during the middle of the night the system does not perform processing that may impact (e.g., write new information, modify information, delete information, etc.) information stored in the dataset, and during this time that the system does not perform processing that may impact such information the system queries the dataset for information pertaining to PII data and the system deletes PII data for a set of individuals (e.g., the set of individuals on the table or mapping, etc.). The implementation of a periodic threshold shutdown time, the system ensures that no inflight requests exist when the system is attempting to search for, and delete/forget, PII data for the set of individuals.

As the system is attempting to search for and delete/forget PII data for the set of individuals, the system may determine whether another process of the system (e.g., a microservice) is using PII data corresponding to a PII key(s) associated with the set of individuals. For example, when the system is attempting to redact PII data for a set of users, the system can determine whether another process is using, or trying to use, the PII data. In response to determining another process of the system is using, or trying to use, the PII data, the system can cause such other process to terminate or cause the other process to delay its processing with respect to the corresponding information until after the deletion/forgetting process is completed. The process to delete/forget the PII data may include deleting the PII data from the corresponding field or overwriting such PII data with random information such as an attempt to obfuscate the PII data. Accordingly, by causing the other process using, or trying to use, the PII data contemporaneous with the process to delete/forget such PII data to pause or delay processing until the PII data is deleted or overwritten with random information, when such other process continues to use the PII data, the process will not be able to obtain the PII data (e.g., because it is deleted) or may obtain the random information written to the field in which the PII data was stored.

The PII data stored in a dataset may be stored encrypted or unencrypted. In the case that the system is configured to store the PII data encrypted, the PII data may be encrypted using the PII key or another key corresponding to the individual (e.g., an encryption key associated with the PII key). The system stores a mapping of PII keys to corresponding encryption keys. In response to determining to access certain PII data, the system determines the PII key associated with the PII data, determines the encryption key associated with the PII data based at least in part on the PII key, obtains the encryption key (e.g., based on a mapping of PII keys to locations of corresponding encryption keys or a mapping of encryption keys to corresponding storage locations for the encryption keys, etc.), and uses the encryption key to decrypt the PII data. In some embodiments, PII data stored in the dataset is subject to double (or more) encryption. For example, in some implementations, the dataset (e.g., information comprised in the dataset) is encrypted based at least in part on a client key, and PII data comprised within the dataset is thereafter further encrypted with an encryption key such as an encryption key mapped to the PII key associated with the PII data stored in the dataset.

According to various embodiments, the system comprises an audit log pertaining to operations performed with respect to information comprised in a dataset. In some implementations, the audit log stores information pertaining to the operations performed with respect to all types of information comprised in the dataset (e.g., all elements of the dataset). In other implementations, the audit log stores information pertaining to operations performed with respect to PII data stored in the dataset (e.g., for elements mapped to an indication that such elements store PII data such as based on a client PII flag and/or a PII flag, etc.). The system uses the audit log in connection with audit operations (e.g., audits to comply with legal regulations, etc.) and/or disaster recovery operations such as to restore the dataset to an earlier state (e.g., a state corresponding to a particular date/time). Examples of information pertaining to operations performed with respect to the dataset include (i) data that is to be written and a corresponding PII flag and PII key (e.g., if PII data is being written), (ii) data that is to be deleted and a corresponding PII flag and PII key (e.g., if PII data is being deleted), (iii) a received request to delete/forget a particular individual (e.g., an indication to delete/forget the individual and an identifier of the individual such as the PII key), (iv) operations performed with respect to PII in the dataset such as a deletion of PII data, a replacement of PII data with a random string, a movement of the PII data to a secure storage area, etc.

According to various embodiments, in response to determining that the dataset is to be returned to an earlier state, the system obtains an earlier version of the dataset (e.g., a version stored in connection with a backup process, etc.). If the system were to restore the earlier version of the dataset without any further modification, then the restored dataset may expose PII data in contravention of applicable laws, regulations, or company policies. For example, any intervening requests to delete/forget an individual that was received (and for which action was taken) since the date of the earlier version. As an illustrative example, if the date on which the earlier version of the dataset was Jan. 1, 2021, and on Mar. 1, 2021 the system determines to restore such earlier version (e.g., in response to a disaster recovery request, or an audit of the system or dataset), then any operations with respect to PII data (e.g., deletions, modifications, etc.) or modified between January 1 and March 1 would not be reflected in the earlier version of the dataset. If an individual with the name Jane Smith input a request for her PII data to be deleted (and the PII data for Jane Smith was stored before January 1), and the request was received on January 15 and the system processed the request and deleted all applicable PII data for Jane Smith on January 16-January 31 (e.g., over a series of scans of the dataset), then the restored dataset having a state as of Jan. 1, 2021 would still comprise PII data associated with Jane Smith. In some embodiments, the system restores the earlier version of the dataset based at least in part on the audit log. Restoring earlier version of the dataset can comprise determining one or more actions/transactions (e.g., intervening requests and/or corresponding operations) performed with respect to the dataset (e.g., operations performed with respect to PII data comprised in the dataset) since the date/time corresponding to the earlier version and recommitting such actions/transactions in relation to the reconstructed dataset.

According to various embodiments, the system stores the audit log to restrict access to the audit log to only certain applications (or types of applications) and/or to certain individuals. The system may store the audit log in a manner that the audit log is not exposed to various applications in the system (or to non-authorized applications). For example, the system configures/maintains the audit log in a manner whereby the audit log does not comprise an application programming interface (API) via which the audit log is accessible. As another example, the system stores the audit log in a separate container or separate virtual machine (e.g., a container or virtual machine distinct from the dataset and/or business applications running on the systems that interact with information stored in the dataset). As another example, the system encrypts the information using a log encryption key, and access to the log encryption key is restricted to a defined set of applications (or types of applications) and/or to certain users (e.g., system administrators, users that are tasked with law/regulation/policy compliance, etc.).

FIG. 1 is a block a diagram of a network system according to various embodiments of the present application. In the example illustrated in FIG. 1, system 100 includes storage service 110, data store 120, administrator system 130, and/or client system 140. In some embodiments, storage service 110 and data store 120 are integrated (e.g., combined into a layer/microservices or a single set of servers). In some embodiments, storage service 110 comprises data layer 112, personal identifiable information (PII) layer 114, and/or business application layer 116. System 100 further includes one or more networks such as network 180 over which administrator system 130 and/or client system 140 communicates with storage service 110 and/or data store 120. In various embodiments, network 180 includes one or more of a wired network, a wireless network such as a cellular network, a wireless local area network (WLAN), and/or any other appropriate network. In some embodiments, data layer 112, PII layer 114, and/or business application layer 116 are respectively implemented by one or more servers. System 100 may include various other systems or terminals.

According to various embodiments, storage service 110 comprises data layer 112, PII layer 114, and/or business application layer 116. Storage service 110 uses data layer 112 to perform one or more operations corresponding to a transaction such as writing information to a record in a dataset, etc. Storage service 110 uses data layer 112 to access and/or store one or more files with respect to a dataset, such as a dataset stored on data store 120. Storage service 110 also uses data layer 112 to manage (e.g., store, update, etc.) an index of information stored in a dataset (e.g., a mapping of files to locations at which the files are stored, etc.). Storage service 110 uses PII layer 114 as a control plane for a set of one or more services provided by system 100 and/or files stored in data layer 112 and the information pertaining to the set of one or more files, such as metadata for the file(s), a mapping of files to locations (e.g., storage locations).

Storage service 110 manages access and/or operations performed with respect to one or more datasets (e.g., datasets stored in data store 120). The operations with respect to a dataset may be invoked by an application such as a business application running on business application layer 116 (e.g., payroll applications, financial transactions applications, financial transaction processing applications, customer relationship management applications, etc.). Storage service 110 configures a dataset, including configuring one or more characteristics pertaining to PII data that may be stored in the dataset. For example, the storage service 110 configures the dataset to store PII data in one or more elements of the dataset (e.g., a field of the dataset, a record of the dataset, etc.), and to track an individual (or set of individuals) with whom the PII data is stored. In some embodiments, storage service 110 uses data layer 112 to configure the dataset.

Data layer 112 configures the dataset based at least in part on one or more instructions or PII configurations obtained from PII layer 114. In some embodiments, the data set is configured (e.g., by data layer 112) to comprise a first field in which PII data is stored and a second field in which a PII key is stored, the PII key stored in the second field being associated with the PII data stored in the first field. The first field and the second field correspond to a same record such as a row in a table or data object. In some embodiments, the dataset is configured (e.g., by data layer 112) in a manner that the record comprises (or is associated with) an identifier that uniquely identifies the record, such as a row identifier or a data object identifier, etc.

In some embodiments, the dataset is configured to indicate dataset elements that are intended or deemed to store PII data. As an example, data layer 112 determines that a particular field is deemed to store PII data, and the dataset is configured (e.g., based at least in part on such determination) to include an associated field in which a corresponding PII key is to be stored (e.g., the association of a field in which PII key is to be stored may serve as an indication that the particular field is deemed to store PII data). As another example, data layer 112 determines that the particular field is deemed to store PII data, and the dataset is configured to include an associated field in which a client PII flag for the particular field is to be set. The dataset may be configured to include one or more fields in which a PII key and a PII flag are stored in association with a field comprising PII data. The PII flag may be set to indicate that a particular field stores PII data in response to a determination that the PII data is stored in the particular field. In addition to the one or more fields in which a PII key and a PII flag are stored, the dataset may include a field in which a client PII flag is set to indicate whether the particular field is intended or deemed to store PII data.

Data layer 112 (or PII layer 114) uses a client PII flag to force an application or other system storing PII data in a particular field to also provide a PII key associated with the PII data. For example, if the client PII flag is set to indicate that the particular field is intended or deemed to store PII data, then data layer 112 requires that the application or other system storing PII data in the particular field contemporaneously provide a PII key to be stored in association with the PII data. Conversely, if the client PII flag is set to indicate that the particular field is not intended or deemed to store PII data, then data layer 112 permits information to be stored (e.g., written, modified, etc.) without requiring that an associated PII key be provided. In some embodiments, only fields of the dataset in which PII data is intended or deemed to be stored have an associated field used for storing the client PII flag value.

Data layer 112 (or PII layer 114) uses the PII flag in connection with searching a dataset for a set of PII data. In some embodiments, the PII flag is used to filter the dataset for only records (or elements of records) that comprise PII data (e.g., records for which the value of the PII flag indicates that PII data is stored in such record). For example, storage service 110 filters the dataset to obtain only records (or elements of records) that comprise PII data before performing a query for a particular set of PII data such as PII data associated with a particular set of one or more PII keys such as a set of PII keys corresponding to person(s) for which the system is to delete/forget corresponding PII data. In some embodiments, all PII data has an associated PII flag stored. In some embodiments, all PII data has an associated PII key stored. In some embodiments, each PII data has an associated PII flag stored. In some embodiments, each PII data has an associated PII key stored.

In some embodiments, storage service 110 (e.g., data layer 112 or PII layer 114) determines whether an element (e.g., a field of a record or data object of the dataset) is intended or deemed to store PII data. Storage service 110 may determine whether an element is intended or deemed to store PII data in connection with a configuring of the dataset (e.g., contemporaneous with deployment of the dataset, etc.). In response to determining that the element is intended or deemed to store PII data, storage service 110 may configure the corresponding dataset to include a field in which a value for a client PII flag is to be stored. Storage service 110 may further ensure that the dataset is configured to include one or more fields in which a PII key and/or PII flag are respectively stored. As an example, storage service 110 determines whether an element is intended or deemed to store PII data based at least in part on a user input or a recommendation service (e.g., a microservice provided by PII layer 114 or data layer 112). As an example, a developer provides an indication of the fields of a record or the types of records in which PII data is to be stored.

The recommendation service may provide to a user or other system (e.g., a user or system/application associated with a client or customer of the system such as via administrator system 130 or client system 140) a recommendation of certain element(s) that are deemed to correspond to PII data, and in response to the user or other system validating the deeming of the element as PII data, storage service 110 deems information stored (or to be stored) in the certain element(s) to be PII data. For example, in response to receiving a validation from the user or other system via administrator system 130 or client system 140, storage service 110 stores an indication(s) that the certain element(s) are intended to store PII data (e.g., in the mapping of elements to PII data, or in second element(s) respectively associated with the certain element(s)). An example of a recommendation that an element of a dataset being deemed PII data is in response to the system determining that a field is labeled (e.g., named or having associated metadata) as a social security number. In response to determining that the field is labeled as a social security number, the system determines that information stored in such a field is PII data and provides an indication that the information is PII data to the user and/or to another system.

In some embodiments, storage service 110 provides a configuration service (e.g., via data layer 112 and/or PII layer 114) that configures datasets for various applications (e.g., different instances for different customers, for different business applications running at business application layer 116 or at another system. Examples of business applications include a payroll application, a finance application, a customer relationship management system, etc. The configuration service configures the datasets to indicate the set of elements comprised in the datasets that are PII data (or deemed to be PII data). For example, the configuration service configures client PII flags for the set of elements comprised in the datasets that are PII data to indicate that such set of elements are PII data. As another example, in connection with configuring a dataset the configuration service generates a mapping of elements of a dataset to an indication of whether the corresponding elements are PII data. In some embodiments, storage service 110 uses a baseline set of elements that are to be mapped to PII data (e.g., for which the client PII flag is to be set as indicating the element comprises PII data) in connection with determining a configuration to apply with respect to the dataset. The baseline set of elements that are to be mapped to PII data may override any indications provided by a client (e.g., a user or other system associated with the client) that an element comprised in the set of elements that are to be mapped to PII data. As an example, the baseline set of elements is not configurable by the client. An example of the application of the baseline set of elements that are to be mapped to PII data is in the context of a payroll application. The payroll application may have a corresponding dataset comprising employee information such as employee identifier, name, address, social security numbers, employee deductions, etc. If the baseline set of elements of storage service 110 comprises name, address, and social security numbers, and the client (e.g., a user at administrator system 130) attempts to configure the dataset such that only the field for social security numbers is indicated to be PII data, the configuration service overrides the client configuration with respect to an element that is included in the baseline set of elements. In some embodiments, the configuration service compares the set of elements for the dataset with the baseline set of elements that are to be mapped to PII data, and automatically forces the client PII flag to be set for elements of the dataset that are comprised in the baseline set of elements.

According to various embodiments, storage service 110 (e.g., data layer 112 and/or PII layer 114) causes PII data to be associated with a PII key when the information is being stored in the dataset. For example, PII layer 114 forces an application (e.g., running on business application layer 116 or other system) attempting to store information deemed to be PII data (e.g., based on the value of a corresponding client PII flag) to provide a corresponding PII key at the time such information is being stored. In some embodiments, PII layer 114 forces the application or other system attempting to store information deemed to be PII data to provide at least one corresponding PII key when the PII data is being stored (e.g., a plurality of individuals may be associated with a particular PII data stored in an element). Storage service 110 restricts storing the PII data (e.g., to the particular element of the dataset such as a field or record) until the corresponding PII key (or identifier or location of the PII key) is provided.

Storage service 110 uses one or more of the plurality of identifiers in connection with searching for particular information (e.g., PII data for a particular person). In response to determining that a record is to be located, the system uses the identifier that uniquely identifies the record/object. For example, the identifier that uniquely identifies the record/object is a row id, and storage service 110 queries a table pertaining to a dataset for information comprised in the row of the table matching the row id. As another example, the identifier that uniquely identifies the record/object is a data object id, and storage service 110 queries the dataset for the data object matching the data object id. In response to determining that a particular PII data (e.g., PII associated with a particular person(s)) is to be located, storage service 110 uses the PII key to identify PII data comprised in the dataset (or plurality of datasets) matching the PII key. For example, storage service 110 filters the dataset according to PII key to return all results matching the PII key.

In some embodiments, storage service 110 uses a PII flag and a PII key to search for/identify PII data pertaining to a particular individual (or set of individuals). The PII flag is used to track whether an element in the dataset (e.g., a record, a field, etc.) comprises PII data. The PII flag may be set at the time that information is stored in the element. For example, the system determines whether the information being stored in the element is PII data. Storage service 110 (e.g., data layer 112) filters the dataset for a subset of elements (e.g., a subset of all records in the dataset, etc.) that respectively include PII data based at least in part the corresponding PII flags set with respect to the elements. In other words, storage service 110 queries the dataset to return all information that includes the PII data (e.g., all information for which corresponding PII flags='yes' or 'true,' etc.). Storage service 110 then uses the subset of elements that respectively include PII data to search for particular information (e.g., elements) corresponding to a PII key for a particular individual (or a set of individuals). The filtering of the dataset based at least in part on values of PII flags to obtain a filtered dataset of only records or elements comprising PII data eliminates the need for storage service 110 to look at information (e.g., elements) that is not productive (e.g., elements storage service 110 does not need to look at because it does not comprise PII data). In response to obtaining the subset of elements that respectively includes PII data, storage service 110 (e.g., data layer 112) queries such subset of elements for PII data pertaining to the one or more individuals for whom the system is searching (e.g., the set of individuals that requested corresponding PII data to be deleted/forgotten). For example, the system queries the dataset for PII data matching the PII key (e.g., the PII key associated with a user that has requested corresponding PII data be deleted).

According to various embodiments, storage service 110 (e.g., PII layer 114) stores a set of individuals for which storage service 110 has determined to delete/forget PII data. Storage service 110 determines to delete/forget PII data for an individual in response to receiving a request such as a request from an application or a client system or based at least in part on an information retention policy (e.g., a determination that a predefined retention period has expired with respect to particular PII data). In some embodiments, storage service 110 stores a mapping of individuals to indications of whether to PII data is to be deleted or forgotten or a table or list of individuals for which the system has determined to delete the PII data. In response to receiving a request to delete PII data for a particular person, PII layer 114 updates the list or mapping indicating the set of individuals for which PII data is to be deleted/forgotten. The system determines one or more individuals to be deleted/forgotten (e.g., based on a request from a user or other system, etc.), and the system correspondingly updates the list or mapping to include the determined one or more individuals to be deleted/forgotten. An example of the information retention policy includes purging PII data after a threshold period of time (e.g., the predefine retention period), such as a year after a particular element is stored in the dataset, etc.

In some embodiments, storage service 110 performs a process to delete or forget PII data for a set of individuals.

PII layer 114 determines to delete/forget particular PII data according to a predetermined schedule or in response to a determination that one or more predetermined conditions is or has taken place. For example, PII layer 114 performs the process to delete or forget the PII data as a batch process. Storage service 110 may query the dataset for PII data corresponding to individuals comprised on a list or mapping of individuals to be deleted/forgotten, and the system may perform the deletion/forgotten as a batch process. The predetermined schedule and/or one or more predetermined conditions may be configurable such as by administrator system 130 or client system 140. Examples of the predetermined schedule includes daily, every other day, weekly, continuously, etc. Examples of predetermined conditions includes a threshold number of individuals on the list or mapping of individuals for which PII data is to be deleted/forgotten (e.g., when the list or mapping comprises at least the threshold number of individuals, the system determines to perform the process to delete or forget the PII data).

In response to determining to perform a process to delete/forget PII data, storage service 110 implements the process to delete/forget the PII data. Storage service 110 may implement one or more of a various set of mechanisms for deleting or forgetting particular PII data. Examples of the mechanisms for deleting/forgetting PII include: (i) deleting PII data stored in a corresponding element (e.g., field) such as by replacing such element with a null value, (ii) obscuring the PII data with noise such as by replacing the PII data with a random string, and/or moving the PII data to a secure storage area (e.g., a trusted zone with heightened access restrictions), (iii) deleting an encryption key corresponding to the PII data (e.g., the encryption key mapped to the PII key), (iv) replacing the encryption key corresponding to the PII data with a random string or a null value, (v) moving the encryption key corresponding to the PII data to a secure storage area, (vi) replacing the PII data with a hash value such as a one-way hash (e.g., such that all instances of PII data for a particular individual is still associated with a unique identifier but the unique identifier is anonymized and thus no longer PII data, (vii) any combination of the foregoing.

In some embodiments, in response to determining to delete or forget PII data for a particular person, storage service 110 (e.g., PII layer 114) attempts to delete or forget the PII data a predetermined number of times (e.g., a threshold number of deletion attempts such as 5 sweeps or scans of the dataset) over a predetermined amount of time (e.g., a threshold deletion time such as a week, 3 weeks, a month, etc.), and/or until a threshold number of sweeps with no action being taken with respect to PII data pertaining to a particular individual has been performed, etc. In various embodiments, the multiple sweeps for data catch PII data that was in transit, about to be stored, or otherwise not available or visible to the sweep process.

In some embodiments, storage service 110 implements a threshold shutdown time (e.g., according to a predetermined schedule) during which storage service (e.g., data layer 112) does not process requests that may impact information stored in the dataset and the system performs the process to delete or forget PII data during such threshold shutdown time. As an example, once a week during the middle of the night the system does not perform processing that may impact (e.g., write new information, modify information, delete information, etc.) information stored in the dataset, and during this time that the system does not perform processing that may impact such information the system queries the dataset for information pertaining to PII data and the system deletes PII data for a set of individuals (e.g., the set of individuals on the table or mapping, etc.).

As the system is attempting to search for, and delete/forget, PII data for the set of individuals, the system may determine whether another process of the system (e.g., a microservice invoked by a business application running at business application layer 116) is using PII data corresponding to a PII key associated with the set of individuals. For example, when the system is attempting to redact PII data for a set of users, the system can determine whether another process is using, or trying to use, the PII data. In response to determining another process of the system is using, or trying to use, the PII data, the system can cause such other process to terminate, or cause the other process to delay its processing with respect to the corresponding information until after the deletion/forgetting process is completed. The process to delete/forget the PII data may include deleting the PII data from the corresponding field or overwriting such PII data with random information such as an attempt to obfuscate the PII. Accordingly, by causing the other process using, or trying to use, the PII data contemporaneous with the process to delete/forget such PII data to pause or delay processing until the PII data is deleted or overwritten with random information (or null or a one-way hash), when such other process continues to use the PII data, the process will not be able to obtain the PII data (e.g., because it is deleted) or may obtain the random, null, or other information written to the field in which the PII data was stored.

Storage service 110 can store PII data in a dataset encrypted or unencrypted. Various encryption mechanisms can be implemented. Examples of encryption mechanisms include a hash encryption method, a symmetric encryption method, an asymmetric method, MD5, or the like. In the case that storage service 110 is configured to store the PII data in an encrypted manner, the PII data is encrypted using the PII key or another key corresponding to the individual (e.g., an encryption key associated with the PII key). In the case that an encryption key associated with a PII key is used to encrypt PII data, storage service 110 (e.g., data layer 112 or PII layer 114) stores a mapping of PII keys to corresponding encryption keys. In response to determining to access certain PII data, PII layer 114 determines the PII key associated with the PII data, PII layer 114 determines the encryption key associated with the PII data based at least in part on the PII key, PII layer 114, or data layer 112 obtains the encryption key (e.g., based on a mapping of PII keys to locations of corresponding encryption keys or a mapping of encryption keys to corresponding storage locations for the encryption keys, etc.), and data layer 112 uses the encryption key to decrypt the PII data. In some embodiments, PII stored in the dataset is subject to double (or more) encryption. For example, in some implementations, the dataset (e.g., information comprised in the dataset) is encrypted based at least in part on a client key (e.g., a key generally used to encrypt data for a client on a cloud storage service such as Amazon Web Services, etc.), and PII data comprised within the dataset is thereafter further encrypted with an encryption key such as an encryption key mapped to the PII key associated with such corresponding PII data stored in the dataset.

According to various embodiments, storage service 110 comprises an audit log pertaining to operations performed with respect to information comprised in a dataset. In other implementations, the audit log stores information pertaining to operations performed with respect to PII data stored in the dataset (e.g., for elements mapped to an indication that such elements store PII data such as based on a client PII flag and/or a PII flag, etc.). The system uses the audit log in connection with audit operations (e.g., audits to comply with legal regulations, etc.) and/or disaster recovery operations such as to restore the dataset to an earlier state (e.g., a state corresponding to a particular date/time). Examples of information pertaining to operations performed with respect to the dataset include (i) data that is to be written and a corresponding PII flag and PII key (e.g., if PII data is being written), (ii) data that is to be deleted and a corresponding PII flag and PII key (e.g., if PII data is being deleted), (iii) a received request to delete/forget a particular individual (e.g., an indication to delete/forget the individual and an identifier of the individual such as the PII key), (iv) operations performed with respect to PII data in the dataset such as a deletion of PII data, a replacement of PII data with a random string, a movement of the PII data to a secure storage area, etc.

According to various embodiments, in response to determining that the dataset is to be returned to an earlier state, the system obtains an earlier version of the dataset (e.g., a version stored in connection with a backup process, etc.). If the system were to restore the earlier version of the dataset without any further modification, then the restored dataset may expose PII in contravention of applicable laws, regulations, or company/service policies. For example, any intervening requests to delete/forget an individual that was received (and for which action was taken) since the date of the earlier version. According to various embodiments, the restoring earlier version of the dataset includes determining one or more actions/transactions (e.g., intervening requests and/or corresponding operations) performed with respect to the dataset (e.g., operations performed with respect to PII data comprised in the dataset) since the date/time corresponding to the earlier version and recommitting such actions/transactions in relation to the reconstructed dataset.

Figure 2:
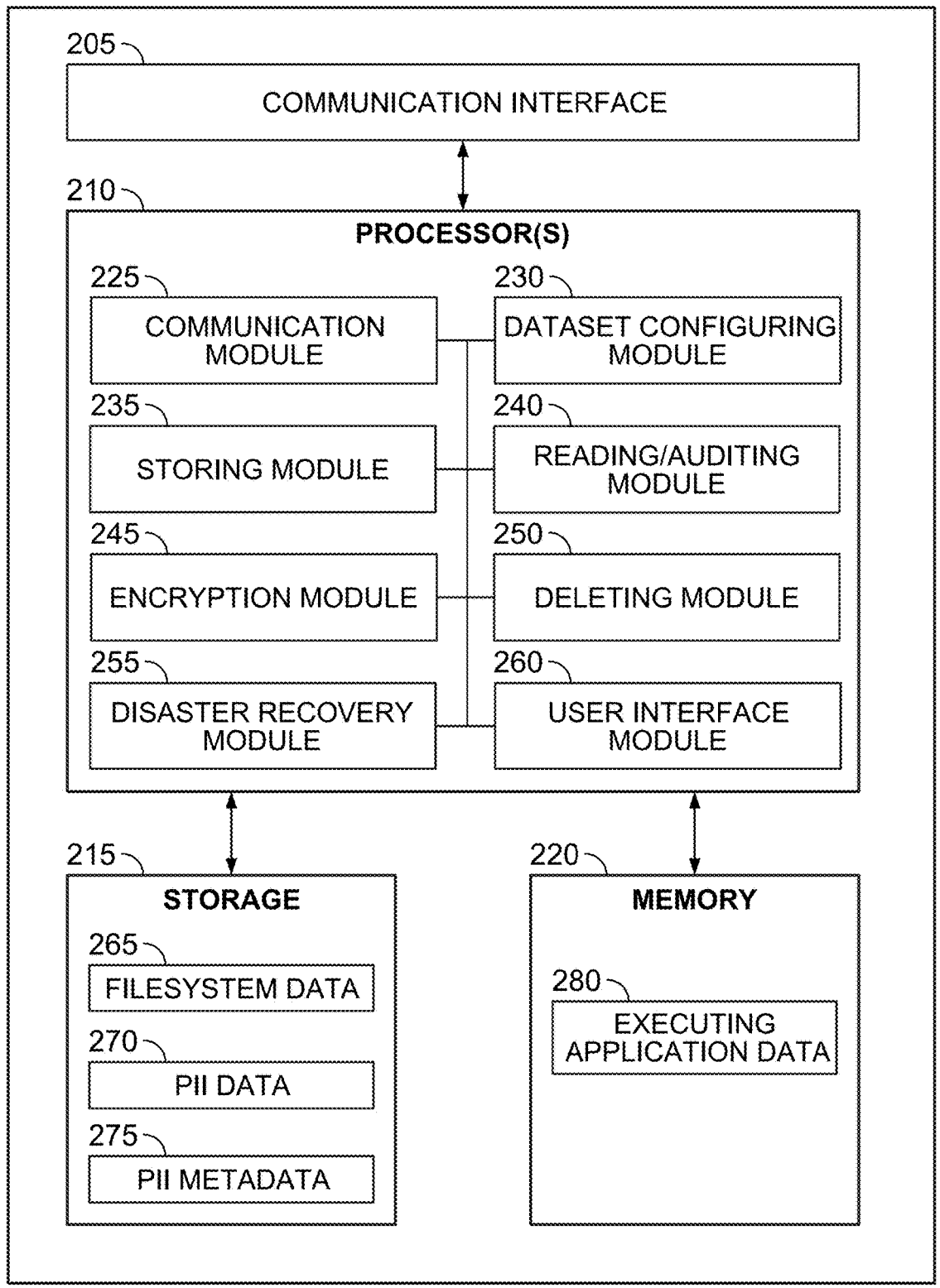
FIG. 2 is a block diagram of a storage service system according to various embodiments of the present application.

FIG. 2 is a block diagram of a storage service system according to various embodiments of the present application. In some embodiments, system 200 comprises or corresponds to storage service 110. In some embodiments, system 200 further comprises one or more of data layer 112, PII layer 114, and/or business application layer 116. System 200 may implement at least part of process 400 of FIG. 4, process 500 of FIG. 5, process 600 of FIG. 6A, process 650 of FIG. 6B, process 700 of FIG. 7, process 800 of FIG. 8A, process 830 of FIG. 8B, process 870 of FIG. 8C, process 900 of FIG. 9A, process 920 of FIG. 9B, process 940 of FIG. 9C, process 960 of FIG. 9D, process 1000 of FIG. 10, and/or process 1100 of FIG. 11.

In the example shown, system 200 implements one or more modules in connection with managing the storage, access, deletion, and/or recovery of information such as a dataset comprising PII data. System 200 comprises communication interface 205, one or more processors 210, storage 215, and/or memory 220. One or more processors 210 comprises one or more of communication module 225, dataset configuring module 230, storing module 235, reading/auditing module 240, encryption module 245, deleting module 250, disaster recovery module 255, and/or user interface module 260.

In some embodiments, system 200 comprises communication module 225. System 200 uses communication module 225 to communicate with various other systems such as an application server, a data store, and/or client terminals or user systems such as administrator system 130 and/or client system 140 of system 100. For example, communication module 225 provides to communication interface 205 information that is to be communicated. As another example, communication interface 205 provides to communication module 225 information received by system 200 such as an instruction to perform an operation with respect to information stored at a dataset (e.g., writing PII data to a dataset), an identifier associated with an operation, a set of storage locations in which a response for an operation is to be stored, a request to perform disaster recover, an audit request, etc. Communication module 225 is configured to receive one or more queries or requests to perform an operation such as to store information in an element or record of a dataset, to audit deletion of PII data in accordance with requests received by system 200, to search for particular PII data such as PII data associated with a particular person, etc. Communication module 225 is configured to provide a response for an operation, such as to a business application, that invoked the query/response, or to administrator system 130 and/or client system 140.

In some embodiments, system 200 comprises dataset configuring module 230. System 200 uses dataset configuring module 230 to determine to configure a dataset to be deployed for a particular client (e.g., customer) of system 200 and to so configure the dataset. Dataset configuring module 230 determines to configure one or more datasets in connection with deployment/configuring of one or more business applications, etc. Examples of business applications include a payroll application, a finance application, a customer relationship management system, etc. Various other business applications may be implemented. Dataset configuring module 230 uses one or more client settings, system settings, and/or business application settings in connection with configuring the dataset.

In some embodiments, dataset configuring module 230 configures the dataset to comprise one or more dataset elements such as fields to be used to store information pertaining to a business application. Dataset configuring module 230 determines whether to further configure the dataset to comprise one or more elements to store PII-related information in association with respective ones of the one or more dataset elements, and dataset configuring module 230 so configures the dataset. In some embodiments, dataset configuring module 230 configures the dataset to comprise a first field in which PII data is stored and a second field in which a PII key is stored or in which a PII flag is stored, the PII key or PII flag stored in the second field being associated with the PII data stored in the first field. The first field and the second field correspond to a same record such as a row in a table, or a data object. In some embodiments, the dataset is configured in a manner that the record comprises (or is associated with) an identifier that uniquely identifies the record, such as a row identifier or a data object identifier, etc. In some embodiments, a third field is stored in the dataset that includes a PII key or a PII flag, which ever is not stored in the second field.

In some embodiments, dataset configuring module 230 configures the dataset to indicate dataset elements that are intended or deemed to store PII data. As an example, dataset configuring module 230 determines that a particular field is deemed to store PII data, and configures the dataset (e.g., based at least in part on such determination) to include an associated field in which a corresponding PII key is to be stored (e.g., the association of a field in which PII key is to be stored may serve as an indication that the particular field is deemed to store PII data). As another example, dataset configuring module 230 determines that the particular field is deemed to store PII data and configures the dataset to include an associated field in which a client PII flag for the particular field is to be set. According to various embodiments, dataset configuring module 230 configures the dataset to include one or more fields in which a PII key and a PII flag are stored in association with a field comprising PII data. The PII flag may be set to indicate that a particular field stores PII data in response to a determination that the PII data is stored in the particular field. In addition to the one or more fields in which a PII key and a PII flag are stored, dataset configuring module 230 configures the dataset to include a field in which a client PII flag is set to indicate whether the particular field is intended or deemed to store PII data.

In some embodiments, system 200 comprises storing module 235. System 200 uses storing module 235 to store information to the dataset. Storing module 235 receives a transaction (e.g., a request to perform an operation) from another system or from an application such as a business application. System 200 determines one or more operations to perform in connection with the transaction. Examples of the one or more operations include storing a new record in the dataset, storing information in a field of a record, deleting information from a record, deleting a record, modifying information stored in a record of the dataset, etc. In response to determining that the one or more operations include performing a write (e.g., writing new data to dataset, modifying a record, etc.), storing module 235 determine whether the information being stored corresponds to PII data. Storing module 235 determines whether the information being stored corresponds to PII data based at least in part on the element to which the information is being written. As an example, storing module 235 determines whether the information being stored corresponds to PII data based at least in part whether the dataset indicates that the element to which the information is being written is deemed to be PII. Storing module 235 can use a value of an associated client PII flag in connection with determining whether the element to which the information is being written is deemed to be PII.

According to various embodiments, storing module 230 uses a value of an associated client PII flag to force an application or other system storing PII data in a particular field to also provide a PII key associated with the PII data. For example, if the client PII flag is set to indicate that the particular field is intended or deemed to store PII data, then storing module 230 requires that the application or other system storing PII data in the particular field contemporaneously provide a PII key to be stored in association with the PII data. Examples of requiring the application or other system storing PII data to provide an associated PII key include one or more of (i) prompting the application or other system to provide an associated PII key, (ii) providing to the application or other system that the write operation with respect to the PII data was not committed because of the lack of an associated PII key, (iii) waiting to store the PII data until an associated PII key is received, (iv) failing the write operation with respect to the PII data, etc. In response to validating that a PII key is provided in connection with a request to write PII data, storing module 230 stores the PII data and the PII key in association with the PII data and/or indicates that the PII data and/or the PII key has been stored. Conversely, if the client PII flag is set to indicate that the particular field is not intended or deemed to store PII data, then storing module 230 permits information to be stored (e.g., written, modified, etc.) without requiring that an associated PII key be provided. In some embodiments, after a data is stored without an associated PII key, the system provides an indication that the data was stored without an associated PII key. In some embodiments, only fields of the dataset in which PII data is intended or deemed to be stored have an associated field used for storing the client PII flag value.

In some embodiments, system 200 comprises reading/auditing module 240. System 200 uses reading/auditing module 240 to access information comprised in the dataset. Reading/auditing module 240 may enforce predefined permissions with respect to a user, application, or other system attempting to access information comprised in the dataset. For example, reading/auditing module 240 uses one or more policies to validate a user, application, or other system attempting to access information comprised in the dataset. In some embodiments, reading/auditing module 240 determines whether the information impacted by an access request comprises PII data, and in response to determining that the information comprises PII data, reading/auditing module 240 restricts access to the PII data based at least in part on the permissions for the user, application, or other system in relation to accessing PII data (or particular PII data). If the information being accessed is stored in an encrypted manner, reading/auditing module 240 uses encryption module 245 to decrypt the information before providing such information.

In some embodiments, system 200 uses reading/auditing module 240 in connection with storing an audit log pertaining to operations performed with respect to a dataset and/or auditing the dataset. A user or other system can audit the dataset with respect to deletion of PII data corresponding to an individual for whom a request to delete/forget PII data had been received. In some embodiments, reading/auditing module 240 stores information pertaining to an action/transaction to data stored in a dataset (e.g., requests, deletion of information, modification of information, etc.) in an audit log. The reading/auditing module 240 can use the audit log to identify intervening requests. Examples of information pertaining to operations performed with respect to the dataset that is stored in the audit log include (i) data that is to be written and a corresponding PII flag and PII key (e.g., if PII data is being written), (ii) data that is to be deleted and a corresponding PII flag and PII key (e.g., if PII data is being deleted), (iii) a received request to delete/forget a particular individual (e.g., an indication to delete/forget the individual and an identifier of the individual such as the PII key), (iv) operations performed with respect to PII data in the dataset such as a deletion of PII data, a replacement of PII data with a random or null string, a movement of the PII data to a secure storage area, etc. Reading/auditing module 240 is configured to generate a report indicating aggregated information that comprises PII data, how PII data is used to determine predictions, summaries, characterizations, etc. Reading/auditing module 240 is configured to store an indication of a source of the PII data, such as in the audit log. In some embodiments, reading/auditing module 240 is configured to automatically react to data changes and run/invoke serverless computations. In some embodiments, reading/auditing module 240 includes a mechanism such as a stream handler set up specifically to react to PII data. This PII stream handler will inspect each incoming payload for the presence of the PII flag (e.g., has_pii) on the top level of the data payload. If that flag is set to 'true,' the system will register the following information: 1) the microservice where the data originated from; 2) the identifier of the data object; and 3) the fields which contain the PII data. Note that the system is not logging the values of the field itself since that would introduce another location where the system would potentially need to redact PII data.

In some embodiments, system 200 comprises encryption module 245. System 200 uses encryption module 245 to encrypt information being stored to the dataset, and to decrypt information being accessed from the dataset. In some embodiments, system 200 is configured to store information (e.g., PII data) stored in dataset as encrypted. In some implementations, system 200 encrypts all information stored in the dataset (e.g., using a client key), or encrypts information determined to be PII data (e.g., based on the write request such as using a value of the client PII flag for the field in which data is being written, or the information being received in conjunction with a PII key, etc.), or both. The PII data may be encrypted using the PII key or another key corresponding to the individual (e.g., an encryption key associated with the PII key). Encryption module 245 stores a mapping of PII keys to corresponding encryption keys, and/or a mapping of clients to client keys. In response to determining that certain PII data is subject to an access request, encryption module 245 determines the PII key associated with the PII data (e.g., using a mapping between the PII key and PII data), determines the encryption key associated with the PII data based at least in part on the PII key, obtains the encryption key (e.g., based on a mapping of PII keys to locations of corresponding encryption keys or a mapping of encryption keys to corresponding storage locations for the encryption keys, etc.), and uses the encryption key to decrypt the PII data. In some embodiments, PII data stored in the dataset is subject to double (or more) encryption. For example, in some implementations, the dataset (e.g., information comprised in the dataset) is encrypted based at least in part on a client key, and PII data comprised within the dataset is thereafter further encrypted with an encryption key such as an encryption key mapped to the PII key associated with such corresponding PII data stored in the dataset.

In some embodiments, system 200 comprises deleting module 250. System 200 uses deleting module 250 to determine whether to delete or forget PII data associated with a particular individual (or set of individuals), and to delete/forget such PII data. According to various embodiments, the deleting or forgetting the PII data comprises deleting, redacting, generalizing, obfuscating, or otherwise anonymizing the PII data. A data processor may comply with an individual's right to be forgotten by ensuring that the data processor does not have reasonable means to re-identify PII data. Thus, if a mechanism other than deleting the PII data is implemented, such mechanism de-identifies the PII data to an extent that the system is not able to reasonable re-identify the PII data. Deleting module 250 may implement various different mechanisms for deleting or forgetting particular PII data can be implemented. Examples of the mechanisms for deleting/forgetting PII data include: (i) deleting PII data stored in a corresponding element (e.g., field) such as by replacing such element with a null value, (ii) obscuring the PII data with noise such as by replacing the PII data with a random string, and/or moving the PII data to a secure storage area (e.g., a trusted zone with heightened access restrictions), (iii) deleting an encryption key corresponding to the PII data (e.g., the encryption key mapped to the PII key), (iv) replacing the encryption key corresponding to the PII data with a random string or a null value or a different encryption key, (v) moving the encryption key corresponding to the PII data to a secure storage area, (vi) replacing the PII data with a hash value such as a one-way hash (e.g., such that all instances of PII data for a particular individual is still associated with a unique identifier but the unique identifier is anonymized and thus no longer PII data, (vii) any combination of the foregoing.

In some embodiments, the system (e.g., deleting module 250) implements an anonymization mechanism to forget PII data associated with an individual. The anonymization mechanism de-identifies the PII data such that the corresponding information is not stored in association with any individual. Examples of the anonymization mechanism include a generalization of the corresponding data, adding noise to the data, etc. Various other anonymization mechanisms may be implemented.

The use of the generalization of data as an anonymization mechanism arises from the concept that certain data elements are more easily connected to certain individuals than other types of data elements. Deleting module 250 generalizes the PII data by remove a portion of the data or replacing some parts of the data with a common value. For example, deleting module 250 uses generalization to replace segments of all area codes or phone numbers with the same sequence of numbers. Generalization allows system 200 to achieve k-anonymity, an industry-standard term used to describe a technique for hiding the identity of individuals in a group of similar individuals. In k-anonymity, the k is a number that represents the size of a group. If for any individual in the dataset, there are at least k–1 individuals who have the same properties, then we have achieved k-anonymity for the data set. For example, imagine a certain dataset where k equals 50 and the property is zip code. If a dataset is analyzed to look at any individual within that data set, the system will return 49 others with the same zip code. Therefore, after generalizing the data system 200 is not be able to identify any one individual using merely a zip code.

However, if all individuals in a dataset share the same value of a sensitive attribute, sensitive information may be revealed simply by knowing these individuals are part of the dataset in question. Various embodiments mitigate this risk by using l-diversity, an industry-standard term used to describe some level of diversity in the sensitive values. For example, imagine a group of people searched for the same sensitive health topic (e.g., flu symptoms) all at the same time. If a dataset is analyzed, system 200 would not be able to determine an individual who searched for the topic because of k-anonymity. However, the dataset may still comprise information that invokes a privacy concern because all individuals within the dataset shares a sensitive attribute (i.e., the topic of the query). L-diversity means the anonymized dataset would not only contain flu searches. Rather, the anonymized dataset could include other searches alongside the flu searches to further protect user privacy.

According to various embodiments, deleting module 250 implements the adding noise to the data as an anonymization mechanism based on an implementation of differential privacy. Differential privacy is an industry-standard term used to describe a technique for adding mathematical noise to data. The use of differential privacy makes analyzing a dataset to ascertain whether any one individual is part of a data set difficult. The difficulty caused by the differential privacy technique arises because the output of a given algorithm will essentially appear the same, regardless of whether any one individual's information is included or omitted. For example, in the case that the system is measuring an overall trend in searches for flu across a geographic region. To achieve differential privacy, noise is added to the data set such as by adding to, or subtracting from, the number of people searching for flu in a given neighborhood. Such noise introduction would not materially affect the measurement of the trend across the broader geographic region. However, adding noise to a data set may render it less useful.

According to various embodiments, deleting module 250 de-identifies particular PII data by encrypting the PII data (or ensuring that the PII data remains encrypted). As an example, encrypting the PII data includes obtaining a key, encrypting the PII data in response to receiving a request to delete/forget a particular individual, and ensuring that the key is not made available such as by disposing the key after the encryption is completed, or moving the key to a secure storage area. As another example, deleting module 250 ensures that the PII data remains encrypted by disposing an encryption key used to keep the PII data encrypted at rest, or otherwise moving the encryption key to a secure storage area with heightened access permission requirements. One challenge with encrypting specific fields is that encryption will immediately remove any ability for system 200 to perform sorted queries on the data. In some embodiments, deleting module 250 implements an order-preserving encryption algorithm to encrypt PII data in connection with de-identifying such data. The order-preserving encryption algorithm preserves some sort order while still obfuscating the data content. In the extremely trivial example below, the standard encryption would mutate the data in such a way that if we wanted to query and get back the data in sorted order (1, 2, 3) it would be impossible after encryption. The order preserving encryption allows the system to get back the rows in the same order, after which the system can then decrypt the data and arrive back at (1, 2, 3).

According to various embodiments, deleting module 250 determines to perform a process to delete or forget PII data for a set of individuals, such as according to a predetermined schedule or in response to a determination that one or more predetermined conditions has been met. For example, deleting module 250 performs the process to delete or forget the PII data as a batch process. Deleting module 250 queries the dataset for PII data corresponding to individuals comprised on a list or mapping of individuals to be deleted/forgotten, and the system may perform the deletion/forgotten as a batch process. The predetermined schedule and/or one or more predetermined conditions may be configurable such as by a user or other system (e.g., a customer system, an administrator, etc.). Examples of the predetermined schedule includes daily, every other day, weekly, continuously, etc. Examples of predetermined conditions includes a threshold number of individuals on the list or mapping of individuals for which PII data is to be deleted/forgotten (e.g., when the list or mapping comprises at least the threshold number of individuals, the system determines to perform the process to delete or forget the PII data). In some embodiments, the system stores a mapping of individuals on the list or mapping of individuals for which PII data is to be deleted/forgotten corresponding to PII keys.

In some embodiments, in response to determining to delete or forget PII data for a particular person, deleting module 250 attempts to delete or forget the PII data a predetermined number of times (e.g., a threshold number of deletion attempts such as 5 sweeps or scans of the dataset) over a predetermined amount of time (e.g., a threshold deletion time such as a week, 3 weeks, a month, etc.), and/or a threshold number of sweeps with no action being taken with respect to information pertaining to a particular person, etc. The use of the predetermined number of time or pre-determined amount of time may be implemented to account for inflight requests that may write/update PII data in the dataset for particular person(s) contemporaneous with an attempt to delete or forget PII data for the particular individual if such person(s) is/are included in the list or mapping. A list or mapping of individuals for which PII data is to be deleted/forgotten may become burdensome if the list or mapping is not purged or updated to remove individuals that have been deleted/forgotten. In some embodiments, deleting module 250 performs a predetermined number of scans of the dataset for PII data (e.g., a scan of the subset of elements that respectively include PII data) for a particular individual (e.g., an individual on the list or mapping). For example, in response to a determination that a particular individual has been included in the list or mapping used to identify and delete/forget PII data in the dataset for a threshold number of scans, the system updates the list or mapping to remove the person and/or PII related to that person. Deleting module 250 can deem that the PII data for the particular individual has been deleted/forgotten after the threshold number of scans, and/or a predetermined threshold number of sweeps (e.g., sequential or consecutive sweeps) has been performed and no PII data for the particular individual has been found.

Deleting module 250 uses one or more of the plurality of identifiers in connection with searching for particular information (e.g., PII for a particular person). In response to determining that a particular PII data is to be located, the system user uses the PII key to identify PII data comprised in the dataset (or plurality of datasets) matching the PII key. For example, the system filters the dataset according to PII key to return all results matching the PII key.

In some embodiments, deleting module 250 uses the PII key to search for/identify PII data pertaining to a particular individual (or set of individuals). For example, deleting module 250 queries the dataset for PII data matching the PII key (e.g., the PII key associated with a user that has requested corresponding PII be deleted). As system 200 scales, the datasets become extremely large and querying the system with respect to all information within the dataset for PII data pertaining to a particular individual may become inefficient, and such querying repeated for several individuals becomes particularly inefficient. In some embodiments, a PII flag is used to track whether an element in the dataset (e.g., a record, a field, etc.) comprises PII data. The PII flag may be set at the time that information is stored in the element. For example, system 200 determines whether the information being stored in the element is PII data. System 200 (e.g., deleting module 250) filters the dataset for a subset of elements (e.g., a subset of all records in the dataset, etc.) that respectively include PII data based at least in part the corresponding PII flags set with respect to the elements. In response to obtaining the subset of elements (e.g., a subset of all records in the dataset, etc.) that respectively include PII data, system 200 stores such subset of elements in cache. The subset of elements that respectively include PII data is queried using PII keys corresponding to a set of individuals that are determined to be deleted/forgotten.

In some embodiments, system 200 comprises disaster recovery module 255. System 200 uses disaster recovery module 255 to recover an earlier version of a dataset. The earlier version of the dataset may be selected by a user or other system, such as a user or other system requesting the disaster recovery. According to various embodiments, disaster recovery module 255 obtains a reconstructed dataset corresponding to the earlier version of the dataset, which is further modified to commit any intervening requests to delete/forget individuals (e.g., redaction requests) that have been received since the date/time corresponding to the earlier version of the dataset. In some embodiments, disaster recovery module 255 obtains a current date/time, determines a date/time corresponding to an earlier version of the dataset, and determines, based at least in part on the audit log, a set of intervening redaction requests received (or alternatively, committed) between the date/time corresponding to the earlier version of the dataset and the current date/time. Thereafter, disaster recovery module 255 restores the earlier version of the dataset based at least in part on the audit log. Restoring the earlier version of the dataset can comprise determining one or more actions/transactions (e.g., intervening requests and/or corresponding operations) performed with respect to the dataset (e.g., operations performed with respect to PII data comprised in the dataset) since the date/time corresponding to the earlier version and recommitting such actions/transactions in relation to the reconstructed dataset.

In some embodiments, system 200 comprises user interface module 260. System 200 uses user interface module 260 to provide a user interface via which a user discovers and/or accesses one or more files stored in a dataset, to request that PII data pertaining to a set of one or more individuals is deleted/forgotten with respect to one or more datasets (e.g., to receive a redaction request), to configure a dataset such as to identify a field of the dataset in which PII data is to be stored, to perform an audit with respect to PII data stored in the dataset or use of the PII data, to request a disaster recovery (e.g., to reconstruct the dataset using an earlier version of the dataset), etc. As an example, the web interface is provided as a web service such as on a page accessed by a user.

According to various embodiments, storage 215 comprises one or more of filesystem data 265, PII data 270, and/or PII metadata 275. Storage 215 comprises a shared storage (e.g., a network storage system) and/or database data, and/or user activity data. In some embodiments, filesystem data 265 comprises a database such as one or more datasets (e.g., one or more datasets for business applications serviced by system 200). Filesystem data 265 comprises data such as a data generated in connection with managing files in a dataset, one or more policies or thresholds, information pertaining to one or more transactions performed with respect to the dataset (e.g., the audit log), etc. In some embodiments, PII data 270 comprises PII data received by system 200 such as in response to a filtering of a dataset in filesystem data 265 to obtain a subset of elements that include PII data. In some embodiments, PII data comprises PII data received by system 200 such as in connection with writing information to a dataset comprised in filesystem data 265. In some embodiments, PII metadata 275 comprises information pertaining to PII data 270 received by system 200. The information pertaining to PII data 270 includes a PII key, an encryption key, a source of the PII data (e.g., an application, process, or user that provided the PII data and/or requested the PII data be written to the dataset), transaction information corresponding to the transaction for which PII data is written to the dataset, etc.

According to various embodiments, memory 220 comprises executing application data 280. Executing application data 280 comprises data obtained or used in connection with executing an application such as an application executing in connection with managing files stored on a dataset, querying information comprised in a dataset, performing disaster recovery, purging PII data, etc. In embodiments, the application comprises one or more applications that perform one or more of receiving and/or executing a query or task, generating a report and/or configuring information that is responsive to an executed query or task, and/or providing to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a payroll application, a customer relationship management application, etc.).

FIG. 3A is a diagram of an example of a dataset according to various embodiments of the present application. In the example shown, dataset 300 comprises a set of information pertaining to a set of individuals. Some of the information comprised in dataset 300 may be deemed to be PII data. In the example shown, in dataset 300 there are 5 rows of data and 9 columns. The columns include an account number column, a first name column, a last name column, an address column, a social security number (SSN) column, an employer name column, an employer address column, a job title column and an annual income column.

FIG. 3B is a diagram of an example of a dataset according to various embodiments of the present application. In the example shown, dataset 310 comprises a set of information pertaining to a set of individuals in which certain fields are designated as comprising PII data. The system configured the dataset 310 to include a field in which a corresponding PII key (e.g., associated with the particular individual) is stored, and a field in which a value for a corresponding PII flag is stored. Dataset 310 comprises account number field 312, first name field 314, last name field 320, address field 326, social security field 332, employer name field 338, employer address field 340, job title field 342, and annual income field 344. As shown the first name field 314, last name field 320, address field 326, and social security field 332 are deemed to comprise PII data. Accordingly, system configured dataset 310 to comprise (i) f_n PII key field 316 (e.g., first name PII key field) to store a PII key associated with the individual and f_n PII flag field 318 to store a value of a flag indicating whether information is stored in first name field 314; (ii) l_n PII key field 322 (e.g., last name PII key field) to store a PII key associated with the individual and l_n PII flag field 324 to store a value of a flag indicating whether information is stored in last name field 320; (iii) address PII key field 328 to store a PII key associated with the individual and address PII flag field 330 to store a value of a flag indicating whether information is stored in address field 326; (iv) SSN PII key field 334 to store a PII key associated with the individual and SSN PII flag field 336 to store a value of a flag indicating whether information is stored in address field 332.

In some embodiments, the system configures the dataset to include a single field associated with a record (e.g., a row of dataset 310) in which the PII key(s) for the individual(s) associated with the record is stored. Accordingly, rather than comprising a field in which a PII key is stored with respect for a record for each field deemed to comprise PII, a single field is used across an entire record or data object to associate the record with a PII key.

Figure 3C:
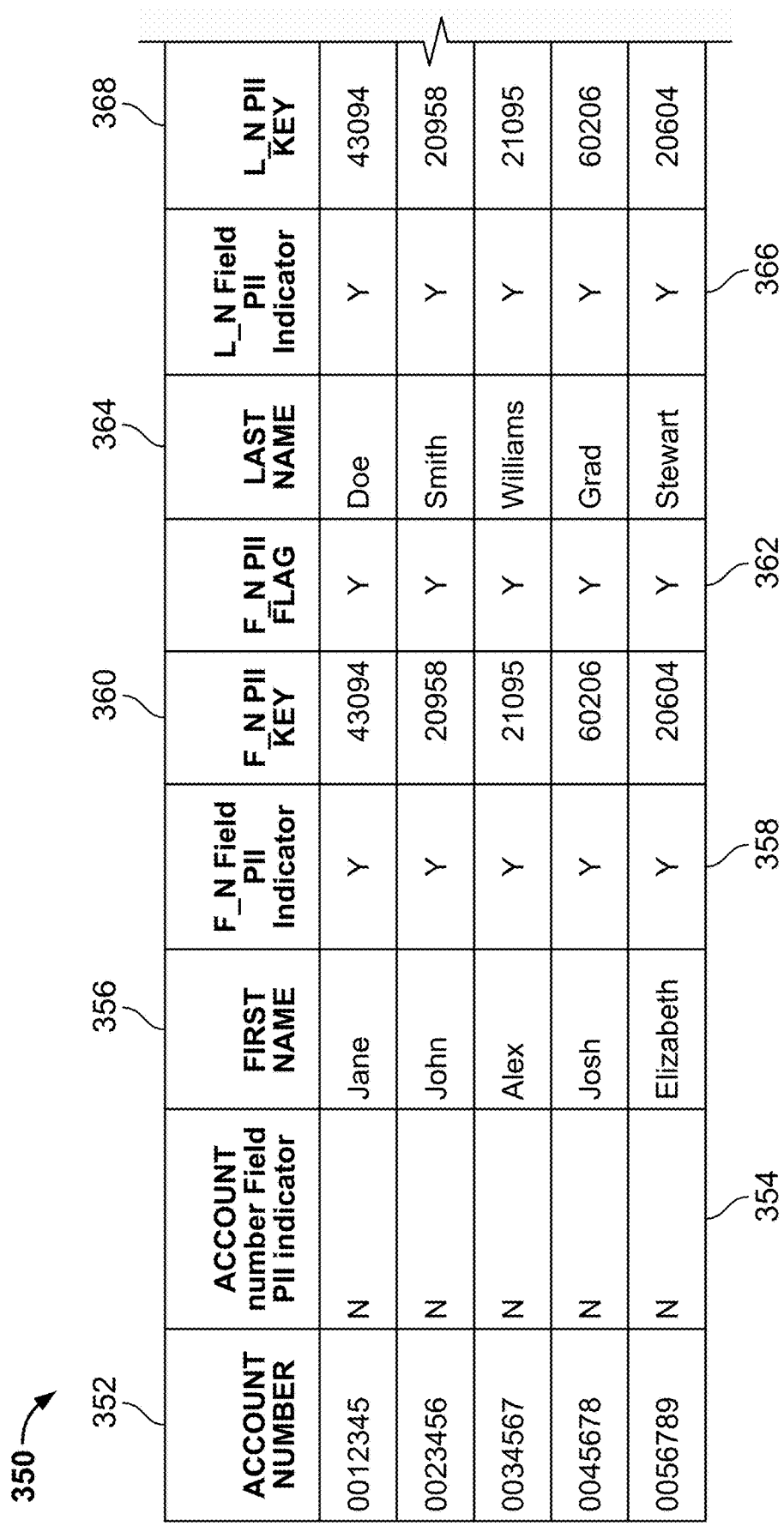
FIG. 3C is a diagram of an example of a dataset according to various embodiments of the present application.

FIG. 3C is a diagram of an example of a dataset according to various embodiments of the present application. In the example shown, dataset 350 comprises a first field in which information is stored, and an associated second field that stores a value for a flag/indicator that indicates whether the first field is intended or deemed to store PII data. The associated second field may be configurable by a user such as an application developer or client administrator.

Dataset 350 comprises account number field 352, first name field 356, last name field 364, address field 372, and social security field 380. The system may store metadata for each of these fields. The metadata indicates whether the corresponding field is intended or deemed to store PII data. In some embodiments, the metadata is stored in a class definition (e.g., a definition of the particular field) or in the data object. In the example illustrated, the metadata is stored in a column of the table for the dataset (e.g., account number field PII indicator 354, first name field PII indicator 358, last name field PII indicator 366, address field PII indicator 374, and social security number field PII indicator 382). In response to determining that a particular field is deemed to comprise PII data, the system configures the dataset to comprise a field in which a PII key is to be stored, and a field in which a value for a PII flag for the corresponding field is stored. As shown first name field 356, last name field 364, address field 372, and social security field 380 are deemed to comprise PII data such as based on first name field PII indicator 358, last name field PII indicator 366, address field PII indicator 374, and social security number field PII indicator 382. Because account number field 352 has corresponding metadata indicating that information stored in the account number field is not PII data, account number field 352 is not associated with a field in which a PII key is stored and/or a value for a PII flag is stored. Accordingly, the system configured dataset 350 to comprise (i) f_n PII key field 360 (e.g., first_name PII key field) to store a PII key associated with the individual and f_n PII flag field 362 to store a value of a flag indicating whether information is stored in first name field 356; (ii) l_n PII key field 368 (e.g., last_name PII key field) to store a PII key associated with the individual and l_n PII flag field 370 to store a value of a flag indicating whether information is stored in last name field 364; (iii) address PII key field 376 to store a PII key associated with the individual and address PII flag field 378 to store a value of a flag indicating whether information is stored in address field 372; (iv) SSN PII key field 384 to store a PII key associated with the individual and SSN PII flag field 386 to store a value of a flag indicating whether information is stored in SSN 380.

Figure 4:
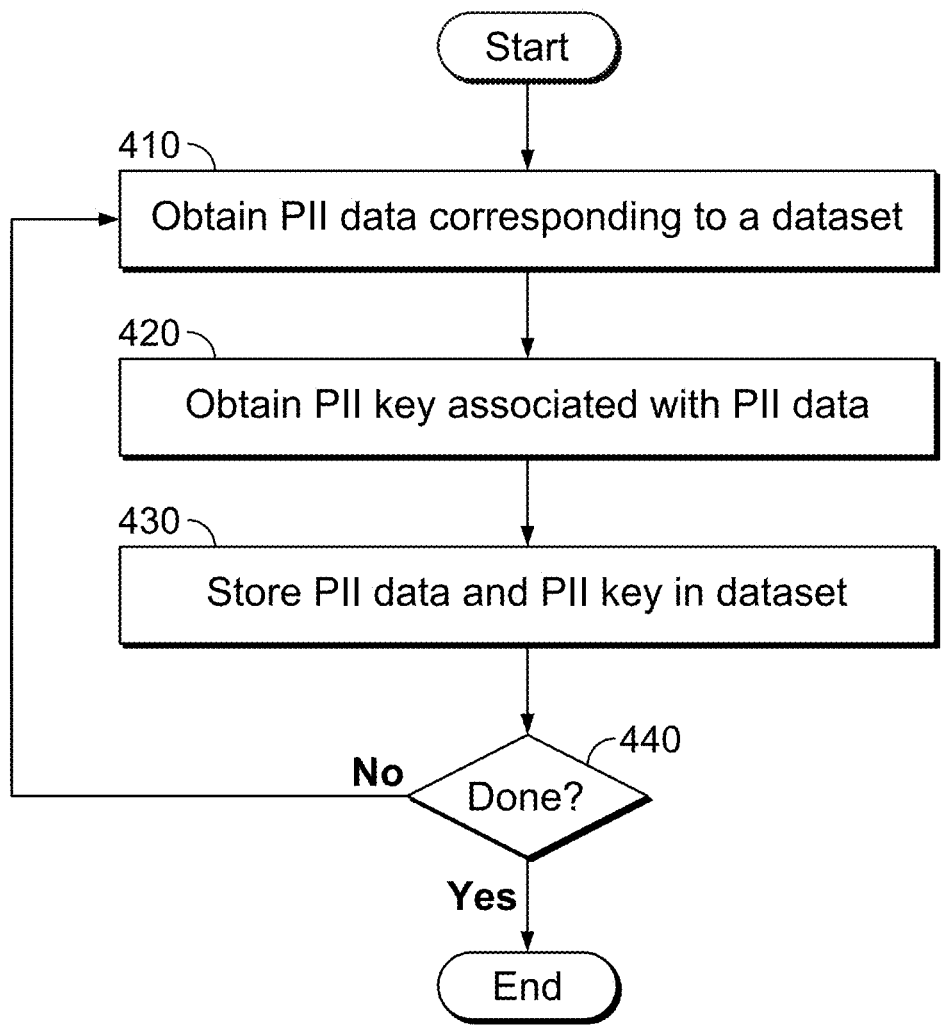
FIG. 4 is a diagram of a method for storing PII data according to various embodiments of the present application.

FIG. 4 is a diagram of a method for storing PII data according to various embodiments of the present application. Process 400 may be implemented at least in part by system 100 of FIG. 1 and/or system 200 of FIG. 2. Process 400 may be implemented in connection with process 500 of FIG. 5, process 600 of FIG. 6A, process 650 of FIG. 6B, process 700 of FIG. 7, process 800 of FIG. 8A, process 830 of FIG. 8B, process 870 of FIG. 8C, process 900 of FIG. 9A, process 920 of FIG. 9B, process 940 of FIG. 9C, process 960 of FIG. 9D, process 1000 of FIG. 10, and/or process 1100 of FIG. 11. Process 400 may be implemented in connection with the system receiving data to be written to a dataset.

At 410, PII data corresponding to a dataset is obtained. In some embodiments, the system obtains the PII data in connection with a write request such as to add a new record to the dataset, to modify a record comprised in the dataset, etc.

At 420, a PII key associated with the PII data is obtained. In some embodiments, the system receives the PII key contemporaneous with the associated PII data. The PII key is unique to an individual or a defined set of individuals. For example, all PII data corresponding to a particular individual stored across one or more datasets of the system is associated with the same unique PII key.

At 430, the PII data and the PII key are stored in the dataset. In response to receiving the PII data and the associated PII key, the PII data is stored and the PII key is stored in association with the corresponding PII data.

At 440, a determination is made as to whether process 400 is complete. In some embodiments, process 500 is determined to be complete in response to a determination that no further PII data is to be stored, no further requests to store PII data are received, no further PII data associated with the individual(s) corresponding to the request(s) to store PII data exist, the user has exited the system, an administrator indicates that process 400 is to be paused or stopped, etc. In response to a determination that process 400 is complete, process 400 ends. In response to a determination that process 400 is not complete, process 400 returns to 410.

Figure 5:
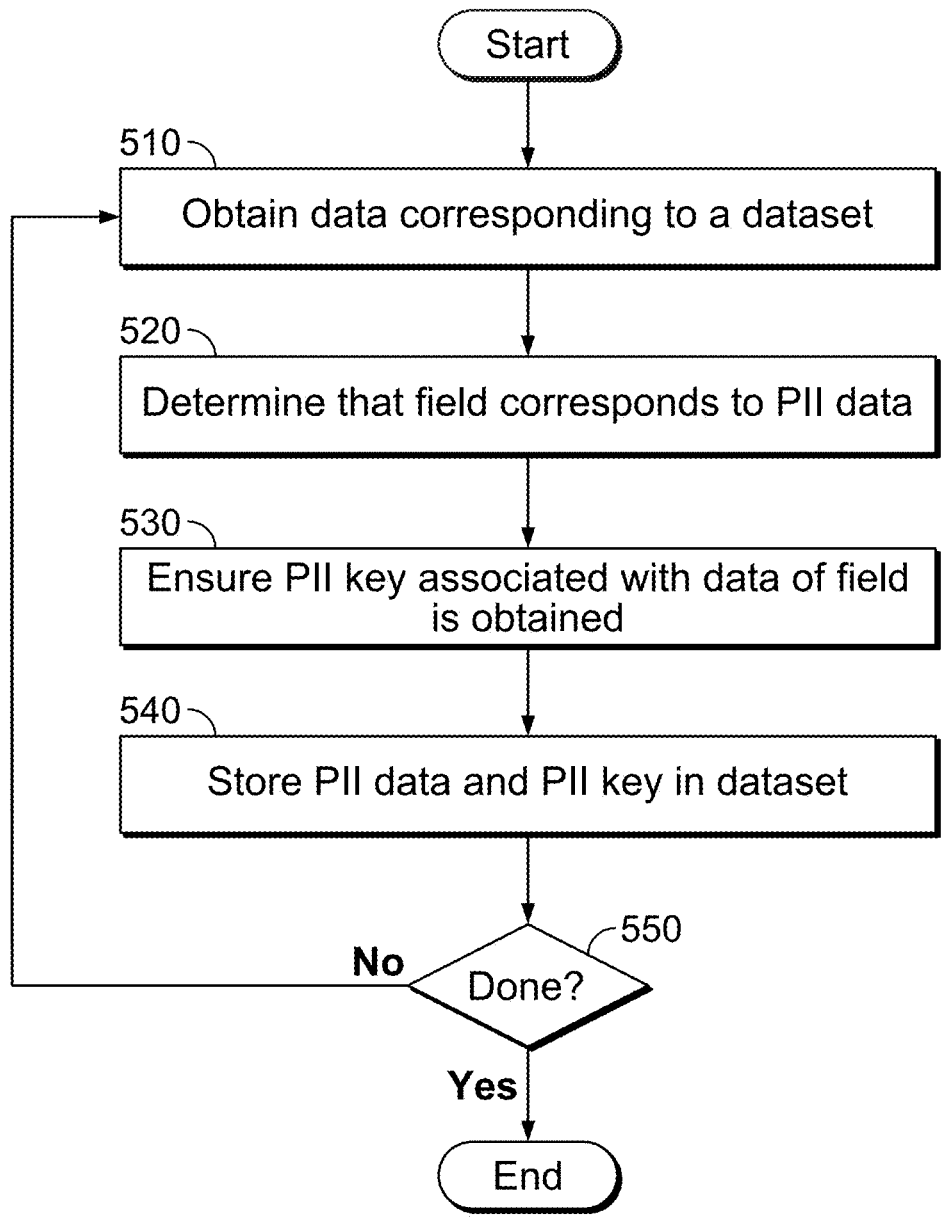
FIG. 5 is a diagram of a method for storing PII data according to various embodiments of the present application.

FIG. 5 is a diagram of a method for storing PII data according to various embodiments of the present application. Process 500 may be implemented at least in part by system 100 of FIG. 1 and/or system 200 of FIG. 2. Process 500 may be implemented in connection with the system receiving data to be written to a dataset.

At 510, data corresponding to a dataset are obtained. In some embodiments, the system obtains the PII data in connection with a write request such as to add a new record to the dataset, to modify a record comprised in the dataset, etc.

At 520, a determination is made that the field in which the obtained data is to be stored corresponds to PII data. The system may determine that received data corresponds to PII data based at least in part on the element(s) of the dataset to which the received data is to be written. For example, the client PII flag associated with the element(s) of the dataset to which the received data is to be written is used to determine whether the received data is PII data.

At 530, ensure that a PII key associated with the data of the field is obtained. In some embodiments, in response to determining that received data corresponds to PII data, the system forces the user, application, or other system from which the PII data is received to provide one or more PII keys associated with the PII data. The system may provide a prompt to the user, application, or other system.

In some embodiments, the system forces the application or other system attempting to store information deemed to be PII data to provide at least one corresponding PII key when the PII data is being stored (e.g., a plurality of individuals may be associated with a particular PII data stored in an element). The system restricts storing the PII data (e.g., to the particular element of the dataset such as a field or record) until the corresponding PII key (or identifier or location of the PII key) is provided. The dataset is configured to indicate dataset elements that are intended or deemed to store PII data (e.g., such as by using a client PII flag). As an example, the indication of whether an element is intended or deemed to store PII data is defined at a class level such that every instance of the class will have the same indication of whether the element is intended or deemed to store PII data. The indication of whether an element is intended or deemed to store PII data is configurable such as by a user (e.g., an administrator, a developer, etc.) or by the system based on a recommendation service (e.g., based on an analysis of information stored across the dataset such as via a machine learning process), etc.

At 540, the PII data and the PII key are stored in the dataset. In response to determining that PII data and an associated PII key are obtained, the system stores the PII data in association with the PII key. For example, the PII data is stored in a first field of a record of the dataset in which the system is instructed to write the PII data, and the PII key is stored in a second field of the record, and the second field is associated with the first field.

At 550, a determination is made as to whether process 500 is complete. In some embodiments, process 500 is determined to be complete in response to a determination that no further PII data is to be stored, no further requests to store PII data are received, no further PII data associated with the individual(s) corresponding to the request(s) to store PII data exist, the user has exited the system, an administrator indicates that process 500 is to be paused or stopped, etc. In response to a determination that process 500 is complete, process 500 ends. In response to a determination that process 500 is not complete, process 500 returns to 510.

Figure 6A:
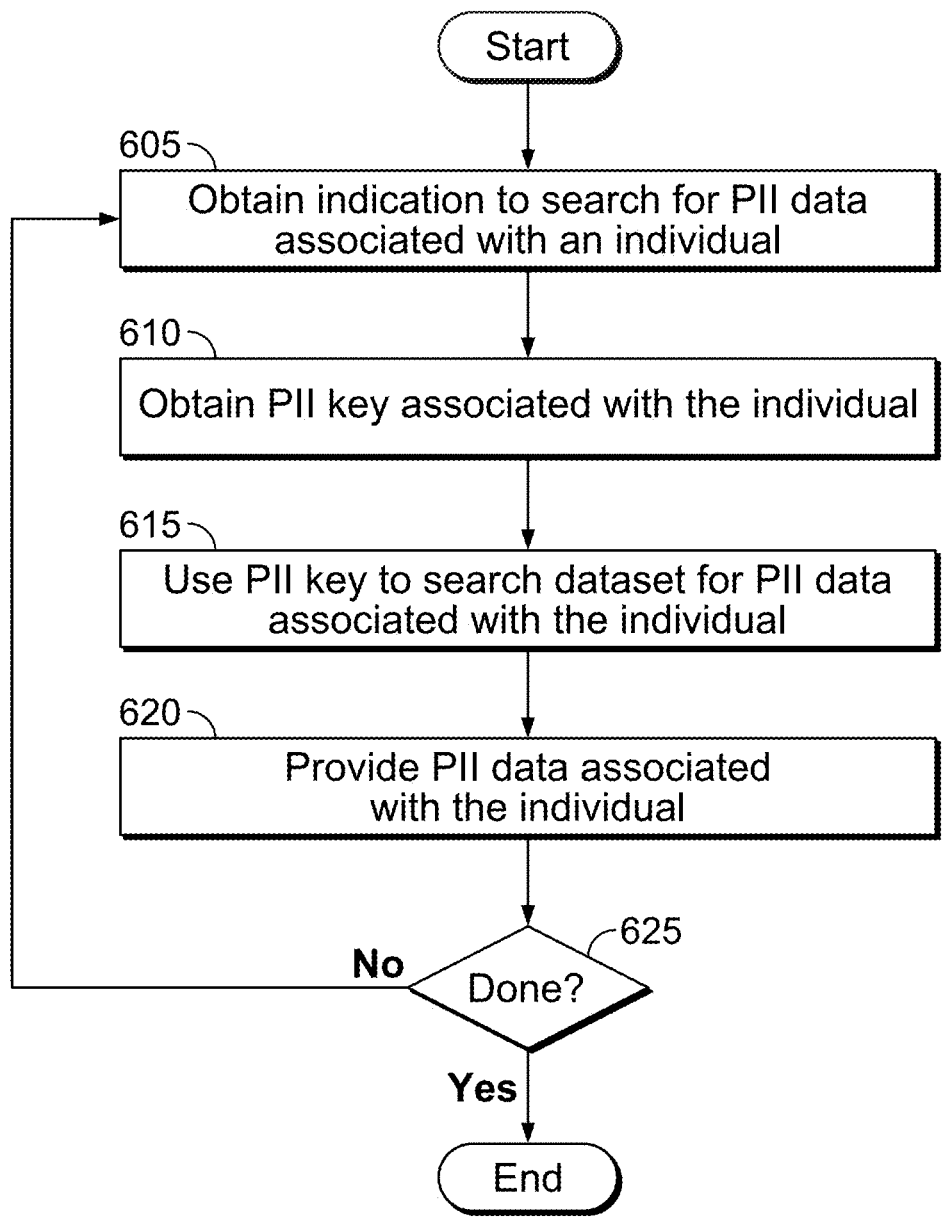
FIG. 6A is a diagram of a method for obtaining PII data according to various embodiments of the present application.

FIG. 6A is a diagram of a method for obtaining PII data according to various embodiments of the present application. Process 600 may be implemented at least in part by system 100 of FIG. 1 and/or system 200 of FIG. 2. Process 600 may be implemented in connection with the system searching for PII data associated with an individual, such as in connection with an auditing process or a process to purge one or more datasets of the PII data associated with the individual.

At 605, an indication to search for PII data associated with an individual is obtained. The indication to search for PII data associated with an individual may correspond to or be obtained in connection with an indication to search for a plurality of individuals. In some embodiments, the system obtains the indication to search for the PII data associated with an individual in response to delete/forget particular PII data according to a predetermined schedule or in response to a determination that one or more predetermined conditions. The system can perform the process to delete or forget the PII data associated with an individual as a batch process of deleting/forgetting the PII data for a set of individuals, or as a distinct process in connection with a particular request to delete/forget the PII data (e.g., a user performs a query with respect to PII data for a particular individual and the user inputs a request to delete all associated PII data).

At 610, a PII key associated with the individual is obtained. In response to determining that PII data associated with an individual is to be deleted/forgotten, the system determines the PII key associated with the individual. The PII key can be comprised in (or received contemporaneous to) the indication to search for PII data associated with the individual. For example, the PII key is comprised in a request from a user, application, or other system to search and/or delete PII data for an individual. As another example, the PII key is comprised in a list that is include with or associated with the indication to search for PII data such as in connection with performing a batch process to delete PII data for a set of individuals.

At 615, the PII key is used to search a dataset for PII data associated with the individual. In some embodiments, the system uses the PII key to search for/identify PII data pertaining to a particular individual (or set of individuals). For example, the system queries the dataset for PII data matching the PII key (e.g., the PII key associated with a user that has requested corresponding PII data be deleted).

However, at scale the dataset is extremely large and querying the system with respect to all information within the dataset for PII data pertaining to a particular individual is relatively inefficient, and such querying repeated for several individuals becomes particularly inefficient. In some embodiments, a PII flag is used to track whether an element in the dataset (e.g., a record, a field, etc.) comprises PII data. The PII flag may be set at the time that information is stored in the element. For example, the system determines whether the information being stored in the element is PII data. The system determines that the information being stored in the element is PII data based at least in part on an indication from another system (e.g., a client system, an application, etc.) from which the information is obtained for storage. In some embodiments, the system uses the PII flags for the elements comprised in the dataset for searching for PII data pertaining to one or more individuals. The system filters the dataset for a subset of elements (e.g., a subset of all records in the dataset, etc.) that respectively include PII data based at least in part the corresponding PII flags set with respect to the elements. In other words, the system queries the dataset to return all information that includes the PII data (e.g., all information for which corresponding PII flags=yes or true, etc.). The subset of elements that respectively include PII data is then used to search for particular information (e.g., elements) corresponding to a PII key for a particular individual (or a set of individuals). In response to obtaining the subset of elements that respectively includes PII data, the system queries such subset of elements for PII data pertaining to the one or more individuals for whom the system is searching (e.g., the set of persons that requested corresponding PII data to be deleted/forgotten).

In some embodiments, the system determines the subset of elements that respectively include PII data and stores the subset such as in a cache for quick response to search and/or delete queries with respect to PII data. In some embodiments, the system determines the subset of elements that respectively include PII data according to a predetermined schedule, or in response to satisfaction of one or more predetermined conditions (e.g., a list of a number of individuals for whom PII data is to be purged exceeds a threshold number of individuals, receipt of a request from an administrator, etc.).

In connection with deleting/forgetting PII data in connection with a batch process, the system queries the dataset for PII data corresponding to individuals comprised on a list or mapping of individuals to be deleted/forgotten, and the system performs the deletion/forgotten as a batch process to remove PII data for each individual comprised on the list or mapping of individuals to be deleted/forgotten. The predetermined schedule and/or one or more predetermined conditions that can invoke the process to purge PII data for one or more individuals may be configurable such as by a user or other system (e.g., a customer system, an administrator, etc.). Examples of the predetermined schedule includes daily, every other day, weekly, continuously, etc. Examples of predetermined conditions includes a threshold number of individuals on the list or mapping of individuals for which PII data is to be deleted/forgotten (e.g., when the list or mapping comprises at least the threshold number of individuals, the system determines to perform the process to delete or forget the PII data). In some embodiments, the system stores a mapping of individuals on the list or mapping of individuals for which PII data is to be deleted/forgotten to corresponding PII keys.

At 620, the PII data associated with the individual is provided. In some embodiments, the PII data is provided to a process or other system that that is performing a purge of PII data for the individual, or a set of individuals. In some embodiments, the PII is provided to a client system, such as via a graphical user interface (e.g., a web interface) that is configured in response to a search query.

At 625, a determination is made as to whether process 600 is complete. In some embodiments, process 600 is determined to be complete in response to a determination that no further PII data is to be found (e.g., returned), no further requests to search for PII data are received, no further PII data associated with the individual(s) corresponding to the request(s) to find PII data exist, the user has exited the system, an administrator indicates that process 600 is to be paused or stopped, etc. In response to a determination that process 600 is complete, process 600 ends. In response to a determination that process 600 is not complete, process 600 returns to 605.

Figure 6B:
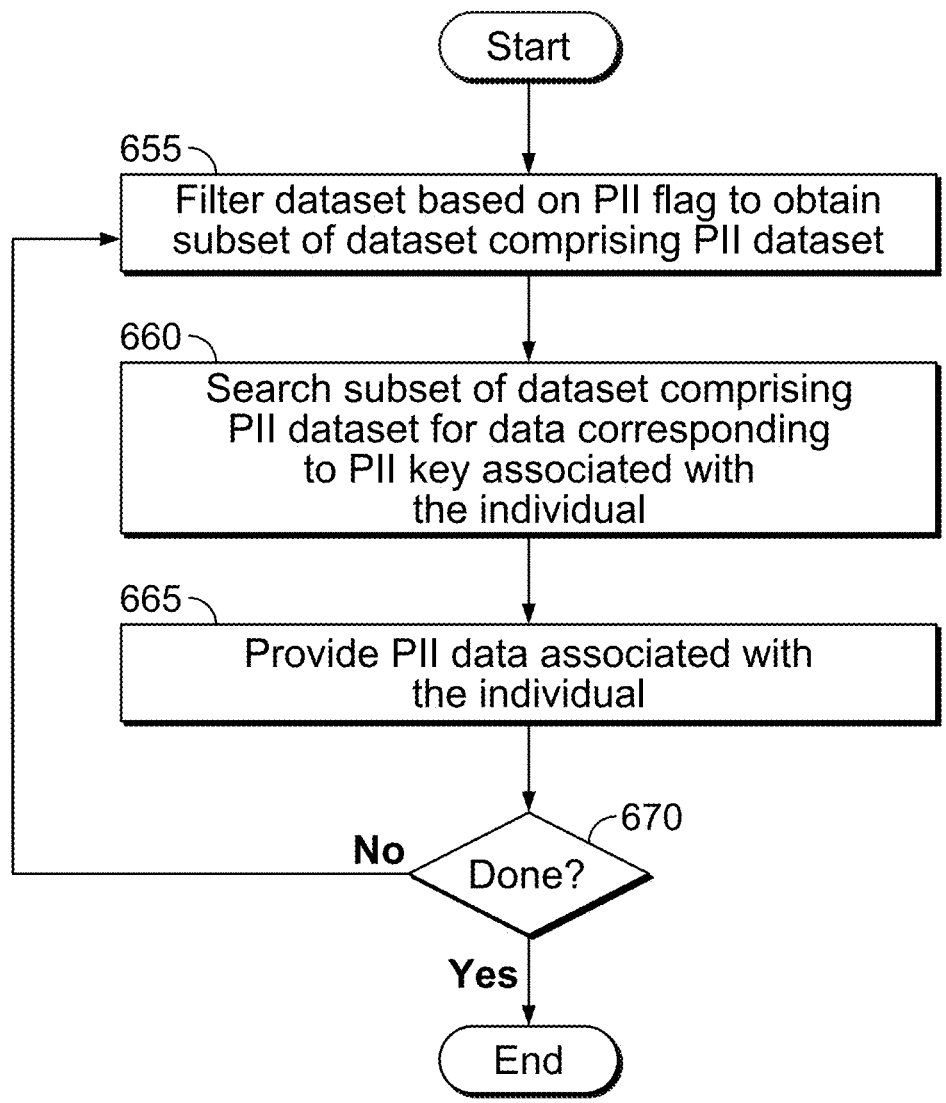
FIG. 6B is a diagram of a method for obtaining PII data according to various embodiments of the present application.

FIG. 6B is a diagram of a method for obtaining PII data according to various embodiments of the present application. Process 650 may be implemented at least in part by system 100 of FIG. 1 and/or system 200 of FIG. 2. In some embodiments, process 650 is invoked in connection with 615 of process 600 of FIG. 6.

At 655, a dataset is filtered based at least in part on a PII flag to obtain a subset of a dataset comprising PII data (e.g., a PII dataset). The filtering of the dataset provides a resulting subset of data which removes information not comprising PII data. For example, only records comprising PII data is returned based on the filtering. As another example, only fields comprising PII data are returned based on the filtering.

At 660, a subset of the dataset comprising PII dataset for data corresponding to the PII key associated with the individual is searched. In response to obtaining the subset of the dataset comprising PII dataset, the system queries the PII dataset for PII data associated with a particular individual, or a set of individuals. For example, requests results within the PII dataset for which the PII data has a PII key matching the PII key for the particular individual or set of individuals.

At 665, PII data associated with the individual is provided.

At 670, a determination is made as to whether process 650 is complete. In some embodiments, process 650 is determined to be complete in response to a determination that no further PII data is to be found (e.g., returned), no further requests to search for PII data are received, no further PII data associated with the individual(s) corresponding to the request(s) to find PII data exist, the user has exited the system, an administrator indicates that process 650 is to be paused or stopped, etc. In response to a determination that process 650 is complete, process 650 ends. In response to a determination that process 650 is not complete, process 650 returns to 655.

Figure 7:
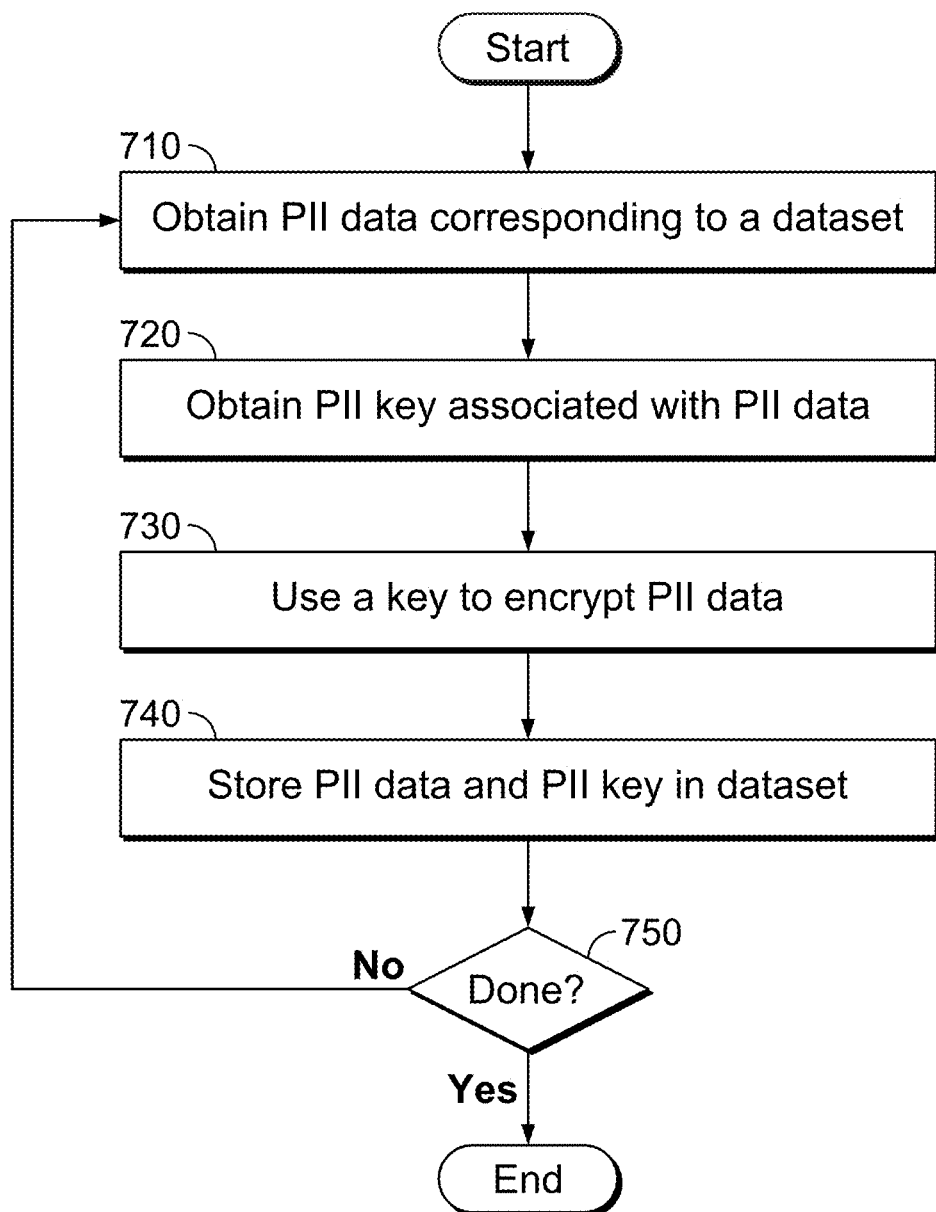
FIG. 7 is a diagram of a method for encrypting PII data according to various embodiments of the present application.

FIG. 7 is a diagram of a method for encrypting PII data according to various embodiments of the present application. Process 700 may be implemented at least in part by system 100 of FIG. 1 and/or system 200 of FIG. 2. Process 700 may be implemented in connection with the system receiving data to be written to a dataset.

At 710, PII data corresponding to a dataset is obtained. In some embodiments, 710 corresponds to, or is similar to, 410 of process 400 of FIG. 4.

At 720, a PII key associated with the PII data is obtained. In some embodiments, 720 corresponds to, or is similar to, 420 of process 400 of FIG. 4.

At 730, a PII key is used to encrypt the PII data. The key used to encrypt the PII data can be the PII key or an encryption key that is different from the PII key. The encryption key can be unique for the piece of PII data to be encrypted, unique with respect to the record in which the PII data is stored, or unique with respect to the individual associated with the PII data (e.g., a plurality of datasets storing PII data associated with a same set of individuals is encrypted using the same encryption key), etc.

At 740, PII data and the PII key are stored in the dataset. In response to obtaining the PII data and encrypting the PII data, the PII data (e.g., the encrypted PII data) is stored and the PII key is stored in association with the corresponding PII data. In addition, the system may store a mapping of the key used to encrypt the PII data to the PII data, the PII key, the record in which the PII data is comprised, etc.

At 750, a determination is made as to whether process 700 is complete. In some embodiments, process 700 is determined to be complete in response to a determination that no further PII data is received, no further PII data is to be encrypted, the user has exited the system, an administrator indicates that process 700 is to be paused or stopped, etc. In response to a determination that process 700 is complete, process 700 ends. In response to a determination that process 700 is not complete, process 700 returns to 710.

Figure 8A:
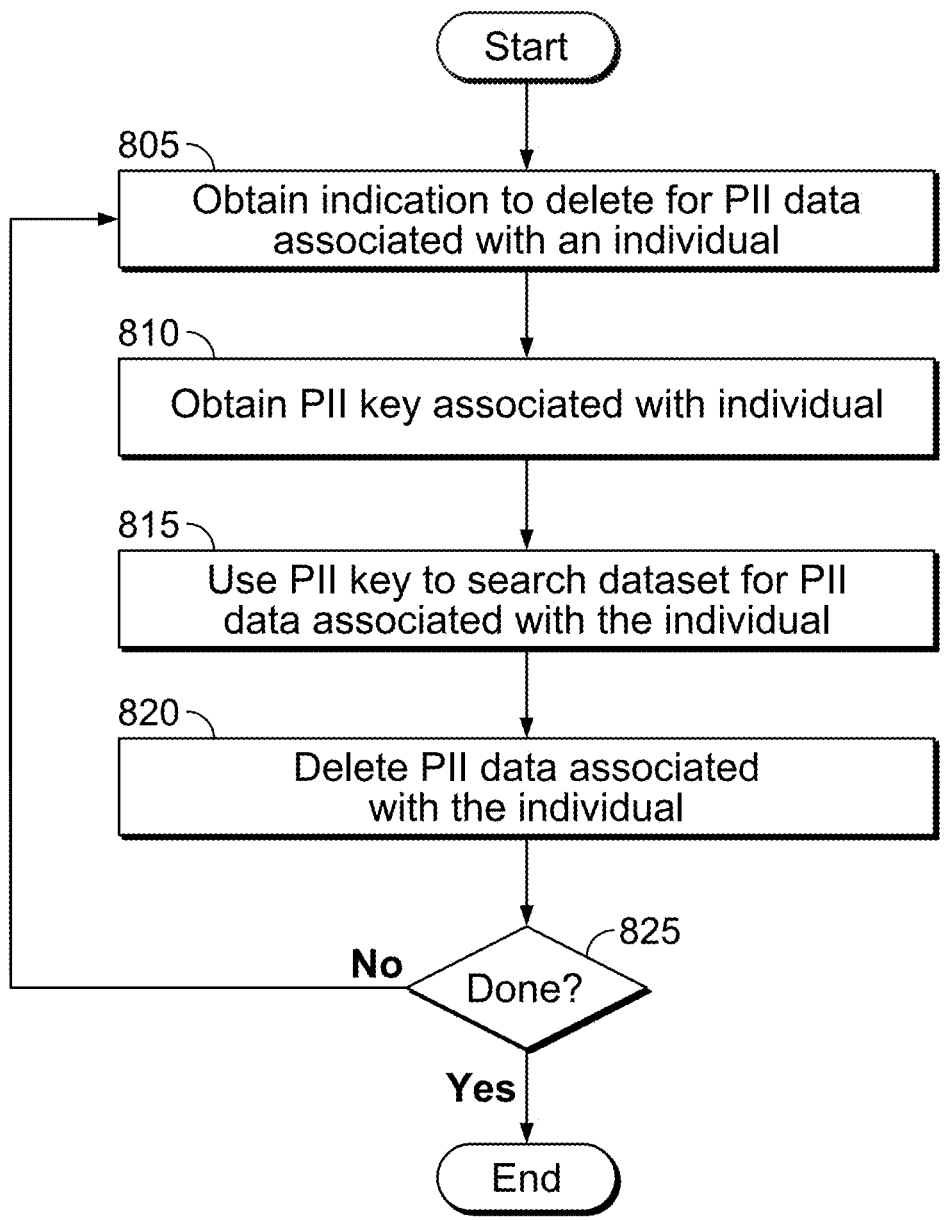
FIG. 8A is a diagram of a method for deleting PII data according to various embodiments of the present application.

FIG. 8A is a diagram of a method for deleting PII data according to various embodiments of the present application. Process 800 may be implemented at least in part by system 100 of FIG. 1 and/or system 200 of FIG. 2. Process 800 may be implemented in connection with the system deleting data from the dataset.

At 805, an indication to delete PII data associated with an individual is obtained. In some embodiments, the indication to delete the PII data is received in connection with a request from a user or other system, such as a request for a particular individual to be forgotten. In some embodiments, the indication to delete the PII data is received in connection with performing a batch process to delete PII data with respect to a set of individuals.

At 810, a PII key associated with an individual is obtained. In some embodiments, the PII key associated with the individual is obtained in connection with the indication to delete PII data associated with an individual or based on a mapping of PII keys to individuals for whom data is stored in the dataset. In some embodiments, the PII key associated with the individual is obtained from a list of individuals for whom PII data is to be deleted/forgotten.

At 815, the PII key is used to search the dataset for the PII data associated with the individual. In some embodiments, searching the dataset for the PII data includes obtaining a PII dataset based on a filtering of the dataset based at least in part on a PII flag associated with a dataset elements or records. In some embodiments, 815 corresponds to, or is similar to, 615 of process 600 of FIG. 6A, or 660 of process 650 of FIG. 6B.

At 820, the PII data associated with the individual is deleted. In some embodiments, the deleting the PII data associated with the individual comprises de-identifying the PII data. The de-identifying the PII data comprises rendering the individual to no longer be determinable based on the PII data. According to various embodiments, the deleting the PII data comprises deleting, redacting, generalizing, obfuscate, or otherwise anonymizing the PII data. In embodiments, the deleting the PII data includes invoking one or more of process 900 of FIG. 9A, process 920 of FIG. 9B, process 940 of FIG. 9C, and/or process 960 of FIG. 9D.

Examples of the mechanisms for deleting the PII data include: (i) deleting PII data stored in a corresponding element (e.g., field) such as by replacing such element with a null value, (ii) obscuring the PII data with noise such as by replacing the PII data with a random string, and/or moving the PII to a secure storage area (e.g., a trusted zone with heightened access restrictions), (iii) deleting an encryption key corresponding to the PII data (e.g., the encryption key mapped to the PII key), (iv) replacing the encryption key corresponding to the PII data with a random string or a null value, (v) moving the encryption key corresponding to the PII data to a secure storage area, (vi) replacing the PII data with a hash value such as a one-way hash (e.g., such that all instances of PII data for a particular individual is still associated with a unique identifier but the unique identifier is anonymized and thus no longer PII data, (vii) any combination of the foregoing.

At 825, a determination is made as to whether process 800 is complete. In some embodiments, process 800 is determined to be complete in response to a determination that the search for the PII is complete, a determination that no further PII corresponding to the individual exists, no further PII is to be obtained for one or more users, the user has exited the system, an administrator indicates that process 800 is to be paused or stopped, etc. In response to a determination that process 800 is complete, process 800 ends. In response to a determination that process 800 is not complete, process 800 returns to 805.

Figure 8B:
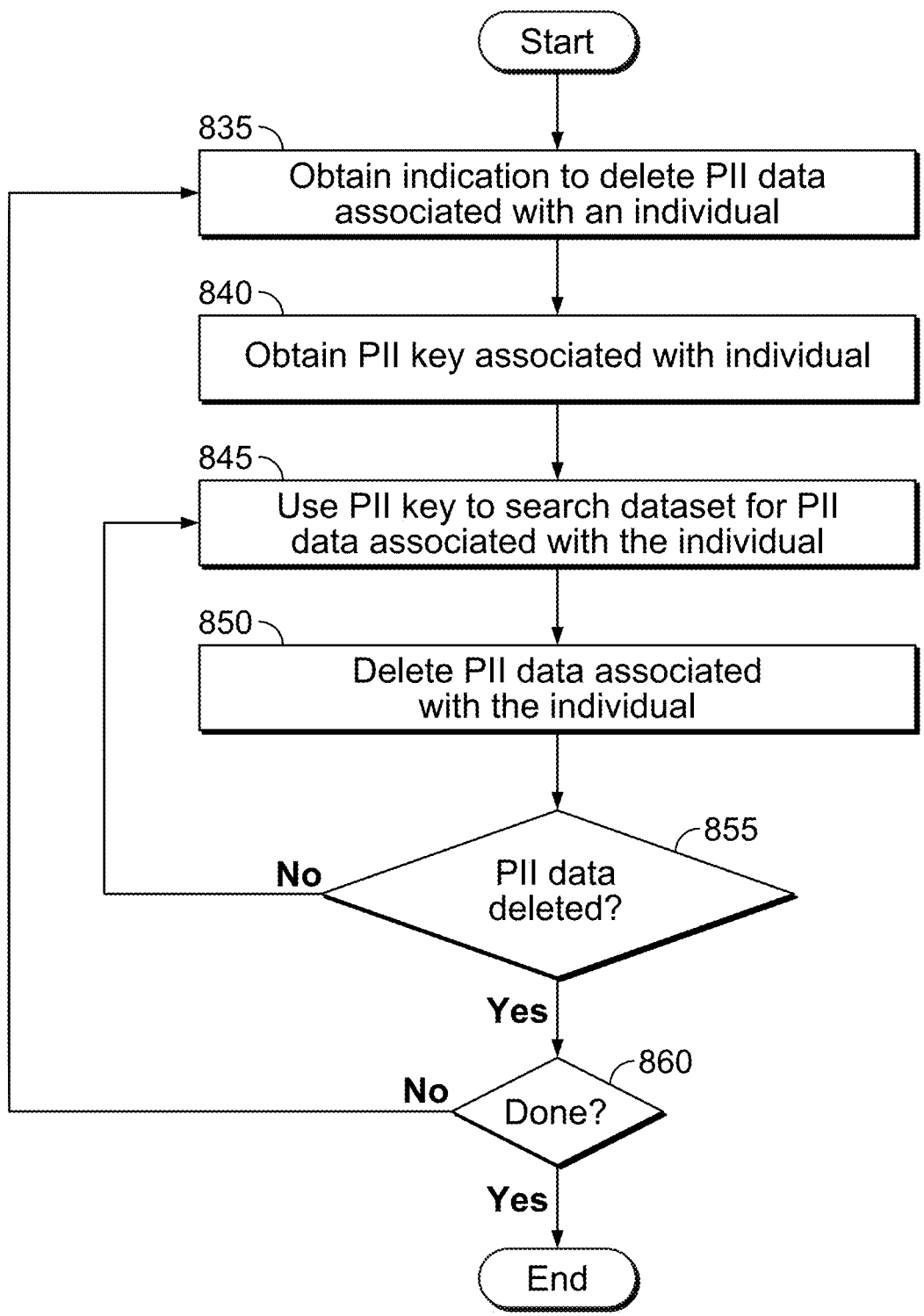
FIG. 8B is a diagram of a method for deleting PII data according to various embodiments of the present application.

FIG. 8B is a diagram of a method for deleting PII data according to various embodiments of the present application. Process 830 may be implemented at least in part by system 100 of FIG. 1 and/or system 200 of FIG. 2. Process 830 may be implemented in connection with the system deleting data from the dataset.

At 835, an indication to delete PII data associated with an individual is obtained. In some embodiments, the indication to delete the PII data is received in connection with a request from a user or other system, such as a request for a particular individual to be forgotten. In some embodiments, the indication to delete the PII data is received in connection with performing a batch process to delete PII data with respect to a set of individuals.

At 840, a PII key associated with the individual is obtained. In some embodiments, the PII key associated with the individual is obtained in connection with the indication to delete PII data associated with an individual or based on a mapping of PII keys to individuals for whom data is stored in the dataset. In some embodiments, the PII key associated with the individual is obtained from a list of individuals for whom PII data is to be deleted/forgotten.

At 845, the PII key is used to search a dataset for PII data associated with the individual. In some embodiments, 845 corresponds to, or is similar to, 615 of process 600 of FIG. 6A, or 660 of process 650 of FIG. 6B.

At 850, the PII data associated with the individual is deleted. In some embodiments, 850 corresponds to, or is similar to, 820 of process 800 of FIG. 8A.

At 855, a determination is made as to whether deletion of the PII data associated with the individual is completed. In some embodiments, the system determines whether the PII data is completed based at least in part on one or more of (i) a determination that the dataset does not comprise any further PII data associated with the individual (e.g., the PII key), (ii) a determination that a number of iterations of scanning and deleting PII data has been performed (e.g., within a threshold period of time), (iii) a determination that a predefined period of time has elapsed since a request was received to delete the PII data for an individual (e.g., the length of time that the individual has remained on the list/mapping of individuals to be deleted/forgotten), and the like, or any combination thereof.

According to various embodiments, the system attempts to delete or forget the PII a predetermined number of times (e.g., a threshold number of deletion attempts such as 5 sweeps or scans of the dataset) over a predetermined amount of time (e.g., a threshold deletion time such as a week, 3 weeks, a month, etc.), and/or a threshold number of sweeps with no action being taken with respect to information pertaining to a particular person, etc. The use of the predetermined number of time or predetermined amount of time may be implemented to account for inflight requests that may write/update PII in the dataset for particular person(s) contemporaneous with an attempt to delete or forget PII for the particular individual if such person(s) is/are included in the list or mapping. A list or mapping of individuals for which PII is to be deleted/forgotten may become burdensome if the list or mapping is not purged or updated to remove individuals that have been deleted/forgotten. The system can perform a predetermined number of scans of the dataset for PII (e.g., a scan of the subset of elements that respectively include PII) for a particular individual (e.g., an individual on the list or mapping. For example, in response to a determination that a particular individual has been included in the list or mapping used to identify and delete/forget PII in the dataset for a threshold number of scans, the system updates the list or mapping to remove the person. In some implementations, the system may deem that the PII for the particular individual has been deleted/forgotten after the threshold number of scans, and/or a predetermined threshold number of sweeps (e.g., sequential or consecutive sweeps) has been performed and no PII for the particular individual has been found. In some embodiments, a scan or sweep corresponds to an iteration of performing 845, 850, and 855.

At 860, a determination is made as to whether process 830 is complete. In some embodiments, process 830 is determined to be complete in response to a determination that the search for the PII is complete, a determination that no further PII corresponding to the individual exists, no further PII is to be obtained for one or more users, the user has exited the system, an administrator indicates that process 830 is to be paused or stopped, etc. In response to a determination that process 830 is complete, process 830 ends. In response to a determination that process 830 is not complete, process 830 returns to 835.

Figure 8C:
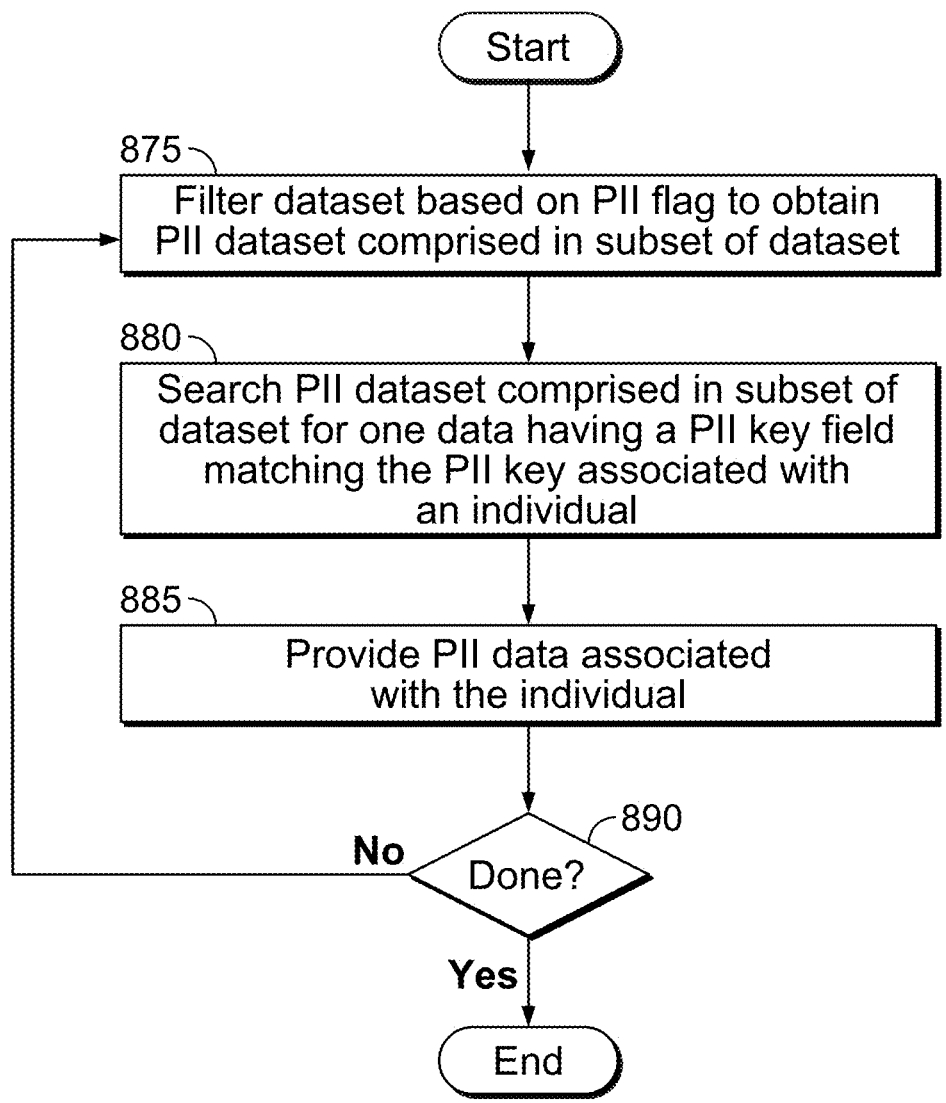
FIG. 8C is a diagram of a method for deleting PII data according to various embodiments of the present application.

FIG. 8C is a diagram of a method for deleting PII data according to various embodiments of the present application. Process 870 may be implemented at least in part by system 100 of FIG. 1 and/or system 200 of FIG. 2. Process 870 may be implemented in connection with searching/identifying PII data corresponding to one or more individuals. In some embodiments, 870 is invoked in connection with 845 of process 830 of FIG. 8B.

At 875, a dataset is filtered based at least in part on a PII flag to obtain a PII dataset comprised in a subset of the dataset. The filtering of the dataset comprises searching the dataset for all records for which the PII flag is deemed to indicate that PII data is stored in the corresponding dataset element or record, At 880, the PII dataset comprised in the subset of the dataset is searched for data having a corresponding PII key field matching the PII key associated with an individual.

At 885, the PII data associated with the individual is provided. In some embodiments, the PII data is provided to a process that invoked process 870 such as process 830. In some embodiments, the PII data is provided to a user, an application, or other system that requested that the PII data be identified.

At 890, a determination is made as to whether process 870 is complete. In some embodiments, process 870 is determined to be complete in response to a determination that the search for the PII is complete, a determination that no further PII corresponding to the individual exists, no further PII is to be obtained for one or more users, the user has exited the system, an administrator indicates that process 870 is to be paused or stopped, etc. In response to a determination that process 870 is complete, process 870 ends. In response to a determination that process 870 is not complete, process 870 returns to 875.

Figure 9A:
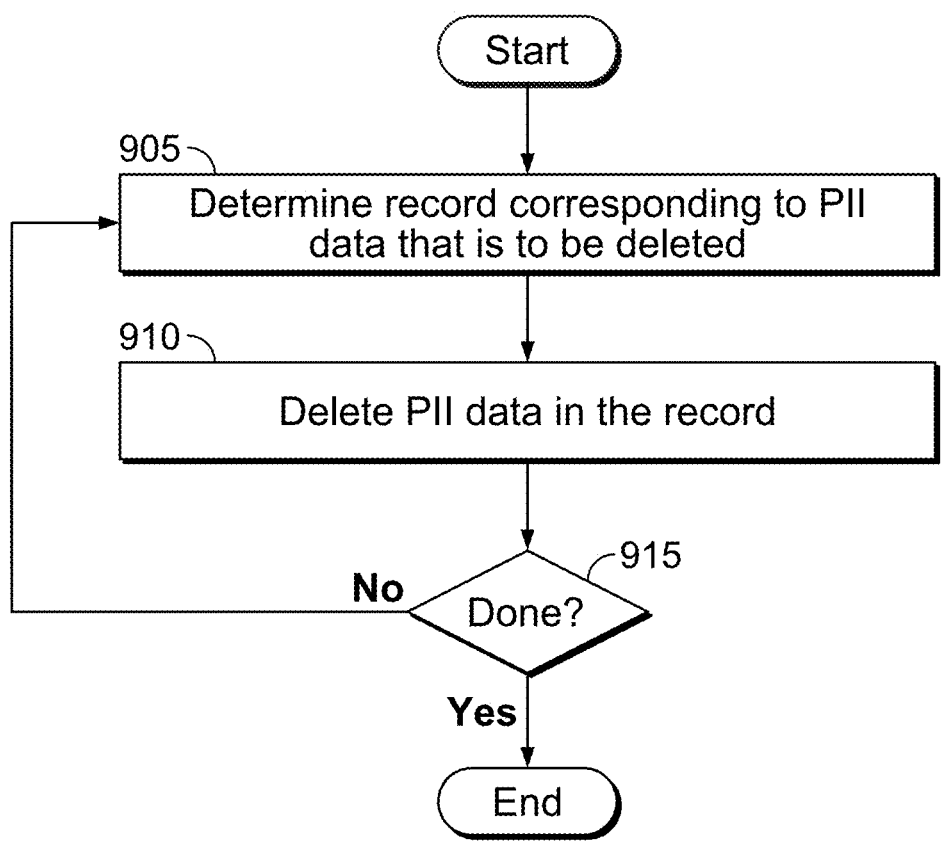
FIG. 9A is a diagram of a method for deleting PII data according to various embodiments of the present application.

FIG. 9A is a diagram of a method for deleting PII data according to various embodiments of the present application. Process 900 may be implemented at least in part by system 100 of FIG. 1 and/or system 200 of FIG. 2. In some embodiments, process 900 is invoked in connection with 815 of process 800 of FIG. 8A, or process 850 of process 830 of FIG. 8B.

At 905, a record corresponding to PII data that is to be deleted is determined.

At 910, PII data comprised in the record is deleted. For example, deleting the PII data can comprise replacing the PII data stored in an element of the dataset (e.g., a field of the dataset) with a null value. In connection with deleting the PII data, a PII flag corresponding to the element of the dataset may be reset (e.g., to indicate that the element no longer stores PII data).

At 915, a determination is made as to whether process 900 is complete. In some embodiments, process 900 is determined to be complete in response to a determination that the PII data is deleted, the user has exited the system, an administrator indicates that process 900 is to be paused or stopped, etc. In response to a determination that process 900 is complete, process 900 ends. In response to a determination that process 900 is not complete, process 900 returns to 905.

Figure 9B:
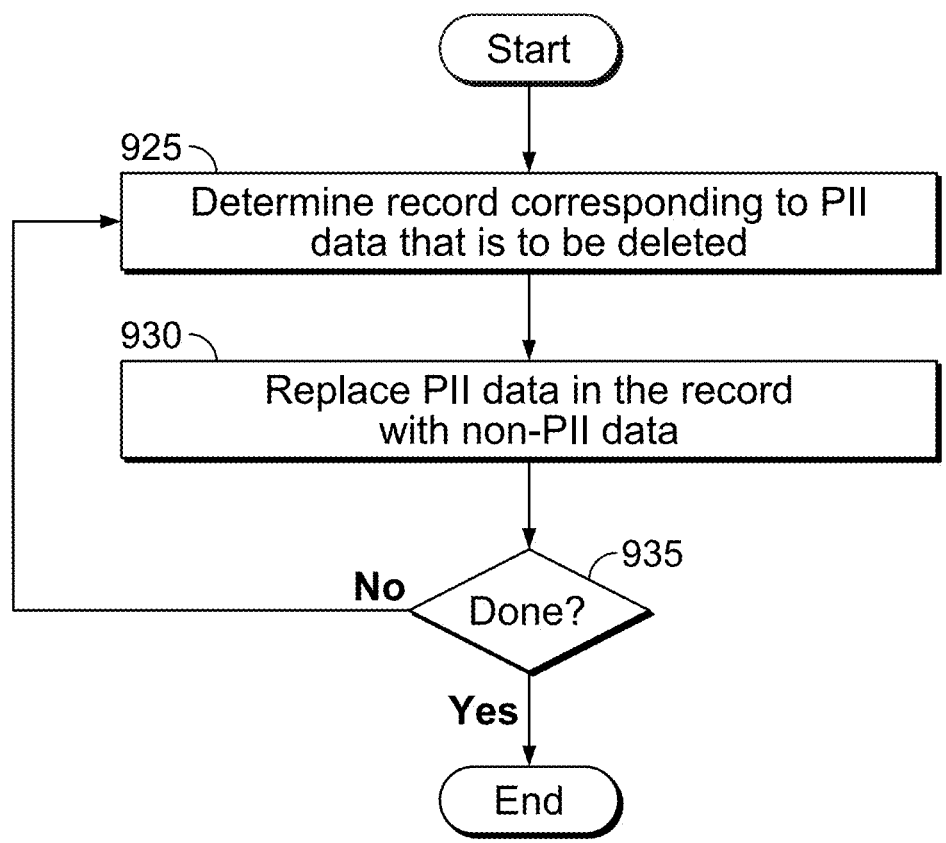
FIG. 9B is a diagram of a method for deleting PII data according to various embodiments of the present application.

FIG. 9B is a diagram of a method for deleting PII data according to various embodiments of the present application. Process 920 may be implemented at least in part by system 100 of FIG. 1 and/or system 200 of FIG. 2. In some embodiments, process 920 is invoked in connection with 815 of process 800 of FIG. 8A, or process 850 of process 830 of FIG. 8B.

At 925, a record corresponding to PII data that is to be deleted is determined. In some embodiments, 925 is the same, or similar to, 905 of process 900 of FIG. 9A.

At 930, PII data comprised in the record is replaced with non-PII data. In some embodiments, replacing the PII data with non-PII data comprises adding/subtracting random noise to the value (e.g., the PII data) comprised in the element in which the PII data is stored. The random noise may be generated using various random noise generation techniques, such as a process to generate Gaussian white noise. In some embodiments, replacing the PII data with non-PII data comprises replacing the PII data with a randomly generated alphanumeric string. The randomly generated alphanumeric string may be generated using various random number generation techniques.

At 935, a determination is made as to whether process 920 is complete. In some embodiments, process 920 is determined to be complete in response to a determination that the PII data is deleted, the user has exited the system, an administrator indicates that process 920 is to be paused or stopped, etc. In response to a determination that process 920 is complete, process 920 ends. In response to a determination that process 920 is not complete, process 920 returns to 925.

Figure 9C:
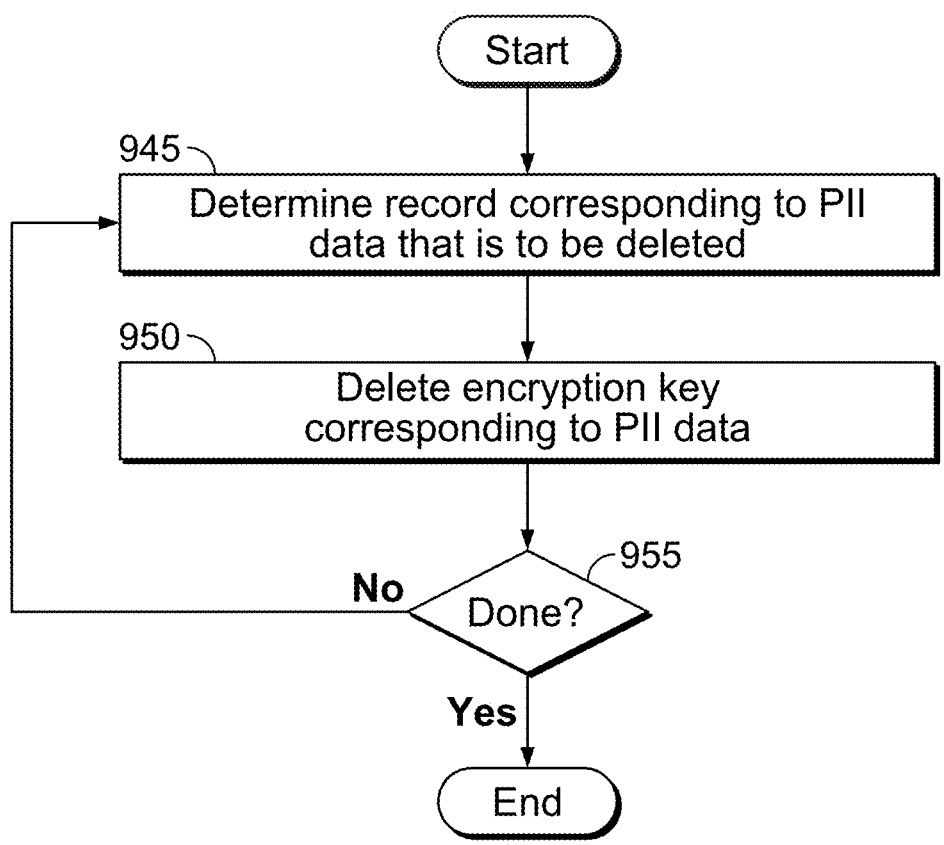
FIG. 9C is a diagram of a method for deleting PII data according to various embodiments of the present application.

FIG. 9C is a diagram of a method for deleting PII data according to various embodiments of the present application. Process 940 may be implemented at least in part by system 100 of FIG. 1 and/or system 200 of FIG. 2. In some embodiments, process 940 is invoked in connection with 815 of process 800 of FIG. 8A, or process 850 of process 830 of FIG. 8B. In some embodiments, process 940 is invoked in connection with 815 of process 800 of FIG. 8A, or process 850 of process 830 of FIG. 8B.

At 945, a record corresponding to PII data that is to be deleted is determined. In some embodiments, 945 is the same, or similar to, 905 of process 900 of FIG. 9A.

At 950, an encryption key corresponding to the PII data is deleted. For example, deletion of the encryption key used to encrypt the PII data can serve the same function as deleting the PII data because the PII data is not obtainable without the encryption key.

At 955, a determination is made as to whether process 940 is complete. In some embodiments, process 940 is determined to be complete in response to a determination that the PII data is deleted, the user has exited the system, an administrator indicates that process 940 is to be paused or stopped, etc. In response to a determination that process 940 is complete, process 940 ends. In response to a determination that process 940 is not complete, process 940 returns to 945.

Figure 9D:
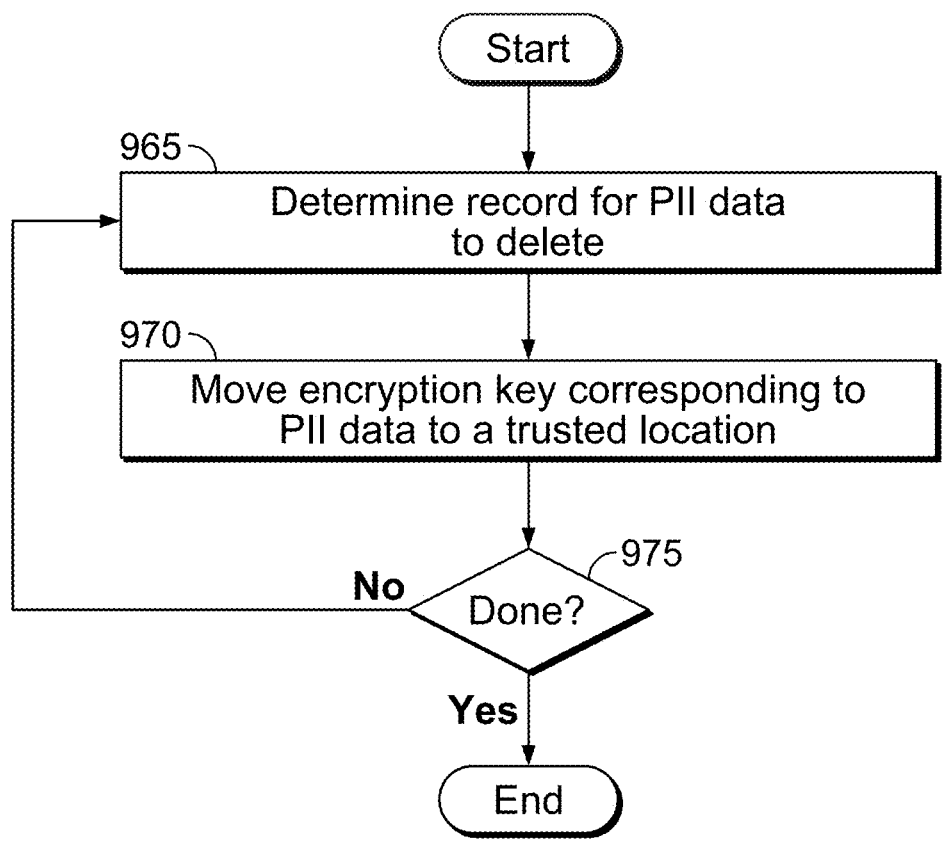
FIG. 9D is a diagram of a method for deleting PII data according to various embodiments of the present application.

FIG. 9D is a diagram of a method for deleting PII data according to various embodiments of the present application. Process 960 may be implemented at least in part by system 100 of FIG. 1 and/or system 200 of FIG. 2. In some embodiments, process 960 is invoked in connection with 815 of process 800 of FIG. 8A, or process 850 of process 830 of FIG. 8B.

At 965, a record corresponding to PII data that is to be deleted is determined. In some embodiments, 965 is the same, or similar to, 905 of process 900 of FIG. 9A.

At 970, an encryption key corresponding to the PII data is moved to a trusted location. For example, moving the encryption key to an area where the encryption key is not accessible by users, applications, or systems operating in the normal course can serve the same function as deleting the PII data because the PII data is not obtainable without the encryption key. In some embodiments, moving the encryption key to a trusted location comprises moving the encryption key to a secure storage area with heightened permission requirements according to which a user, application, or other system is not permitted to access such data, and only select users or systems may obtain information in the event of a special circumstance such as a court order, subpoena, compliance audit, or the like.

At 975, a determination is made as to whether process 960 is complete. In some embodiments, process 960 is determined to be complete in response to a determination that the PII data is deleted, the user has exited the system, an administrator indicates that process 960 is to be paused or stopped, etc. In response to a determination that process 960 is complete, process 960 ends. In response to a determination that process 960 is not complete, process 960 returns to 965.

Figure 10:
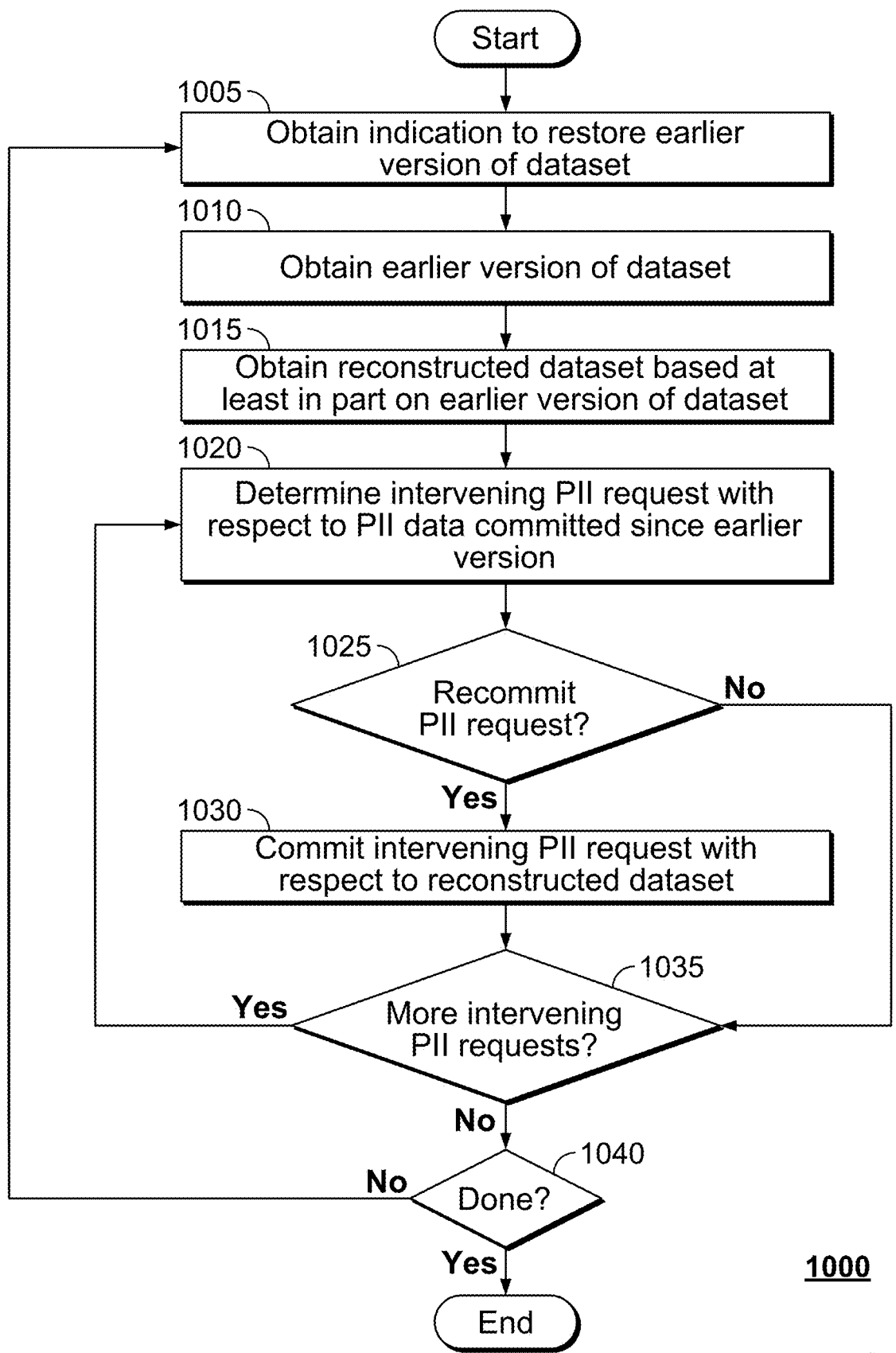
FIG. 10 is a diagram of a method for recovering a dataset including PII data according to various embodiments of the present application.

FIG. 10 is a diagram of a method for recovering a dataset including PII data according to various embodiments of the present application. Process 1000 may be implemented at least in part by system 100 of FIG. 1 and/or system 200 of FIG. 2.

At 1005, an indication to restore an earlier version of a dataset is obtained. In some embodiments, the indication to restore an earlier version of the dataset is received in connection with a disaster recovery process that may be automatically invoked in response to a determination of a failure or invoked by a user based on a user request. In some embodiments, the indication to restore the earlier version can include an identifier associated with the earlier version (e.g., a backup identifier), or date/time associated with the earlier version.

At 1010, the earlier version of the dataset is obtained. In some embodiments, the system obtains the earlier version of the dataset from a repository of versions of the dataset such as a backup repository storing backups of the dataset. The earlier versions of the dataset may be captured according to a predetermined schedule (e.g., daily backups, monthly backups, etc.), or in response to a request to perform a backup such as based on a user input (e.g., before an update to the application is performed, etc.).

At 1015, a reconstructed dataset is obtained based at least in part on an earlier version of a dataset. For example, the system restores the earlier version of the dataset to obtain a reconstructed dataset. The reconstructed dataset comprises information corresponding to a state of the dataset at time at which the earlier version was captured (e.g., when the backup/snapshot of the dataset was performed).

At 1020, an intervening PII request with respect to PII data committed since the earlier version is determined. In some embodiments, the system uses an audit log to determine intervening PII requests (e.g., redaction requests, etc.) that were committed with respect to the dataset since the earlier version of the dataset was captured. Examples of intervening PII request include redaction requests (e.g., a request to delete/forget an individual), a write request to write new PII data to the dataset, a write request to modify PII data stored in the dataset, etc.

At 1025, a determination is made as to whether to commit the PII request with respect to the reconstructed dataset. In some embodiments, the system determines whether to commit the PII request based on a type of PII request. For example, the system determines to commit intervening redaction requests to ensure that the system complies with the applicable laws, regulations, etc. pertaining to an individual's right to forget. As another example, the system determines not to commit intervening write request to write new PII data to the dataset, or write requests to modify PII data (e.g., because such requests would cause the reconstructed dataset to deviate from the information comprised in the earlier version of the dataset).

In response to a determination to commit the PII request with respect to the reconstructed dataset at 1025, process 1000 proceeds to 1030 at which the intervening PII request is committed with respect to the reconstructed dataset, and thereafter proceeds to 1035.

In response to a determination not to commit the PII request with respect to the reconstructed dataset at 1025, process 1000 proceeds to 1035. At 1035, a determination is made as to whether more intervening PII requests exist. In response to a determination that no further intervening PII requests exist at 1035, process 1000 proceeds to 1040. Conversely, in response to a determination that further intervening PII request(s) exist at 1035, process 1000 returns to 1020, and process 1000 iterates through 1020-1035 until no further intervening PII requests exists.

At 1040, a determination is made as to whether process 1000 is complete. In some embodiments, process 1000 is determined to be complete in response to a determination that no further intervening PII requests exit (e.g., are included in the audit log since a date corresponding to the earlier version of the dataset), a user has indicated that no further intervening PII requests are to be committed with respect to the reconstructed dataset, no further datasets are to be restored (e.g., recovered), the user has exited the system, an administrator indicates that process 1000 is to be paused or stopped, etc. In response to a determination that process 1000 is complete, process 1000 ends. In response to a determination that process 1000 is not complete, process 1000 returns to 1005.

Figure 11:
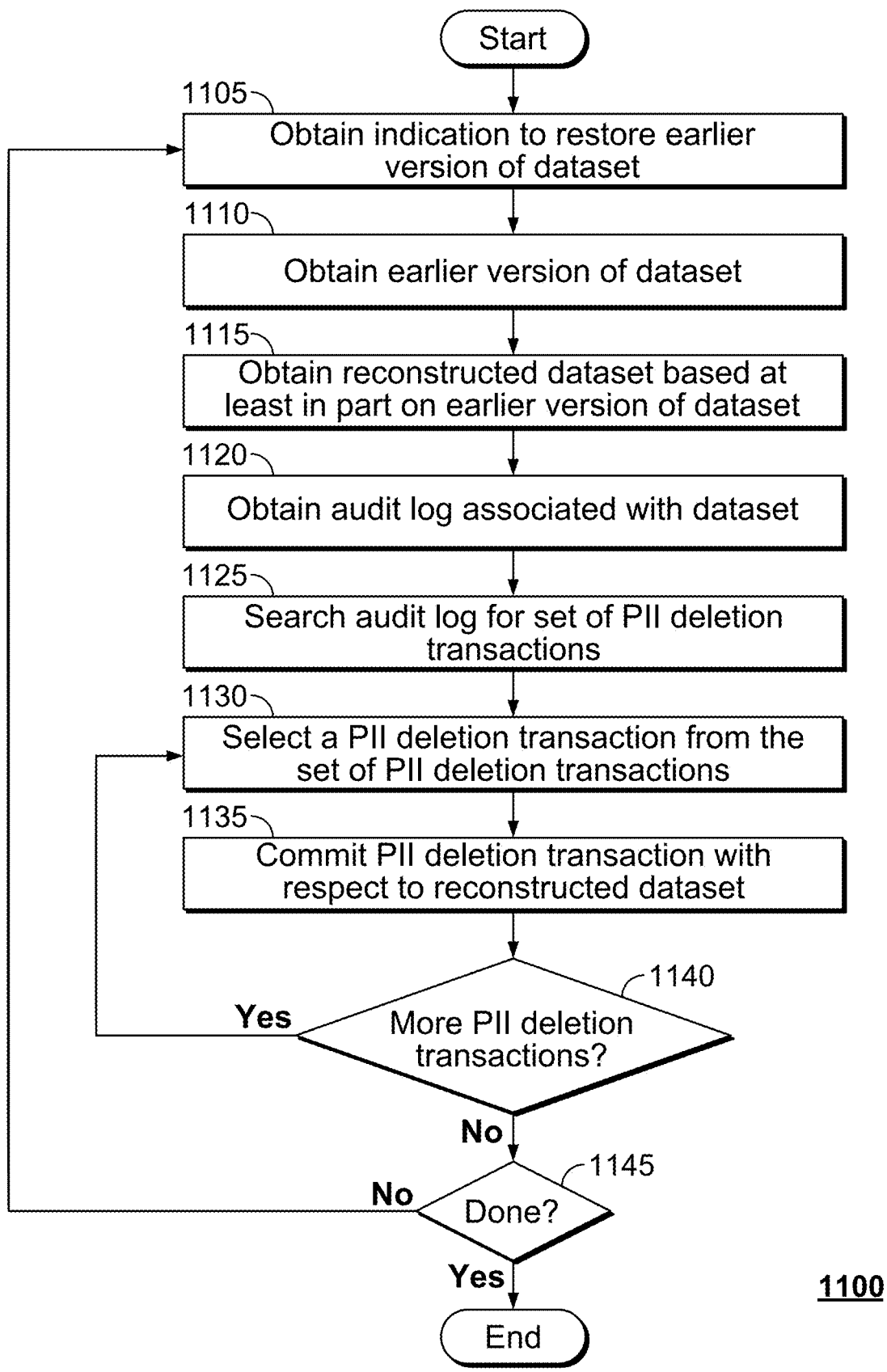
FIG. 11 is a diagram of a method for recovering a dataset including PII data according to various embodiments of the present application.

FIG. 11 is a diagram of a method for recovering a dataset including PII data according to various embodiments of the present application.

At 1105, an indication to restore an earlier version of a dataset is obtained. In some embodiments, 1105 corresponds to, or is similar to, 1005 of FIG. 10.

At 1110, the earlier version of the dataset is obtained. In some embodiments, 1110 corresponds to, or is similar to, 1010 of FIG. 10.

At 1115, a reconstructed dataset is obtained based at least in part on an earlier version of a dataset. In some embodiments, 1115 corresponds to, or is similar to, 1015 of FIG. 10.

At 1120, an audit log associated with the dataset is obtained.

At 1125, the audit log is searched for a set of PII deletion transactions. In response to obtaining the audit log, the system determines transactions comprised in the audit log pertaining to PII requests and/or a subset of the PII requests pertaining to PII deletion requests.

At 1130, a PII deletion transaction is selected from the set of PII deletion transactions. In some embodiments, the system iteratively selects PII deletion transactions from the set of PII deletion requests and iterates over a determination of whether to commit the PII deletion requests and deleting the PII data corresponding the PII deletion requests which the system determines to recommit.

At 1135, the PII deletion transaction is committed with respect to the reconstructed dataset.

At 1140, a determination is made as to whether further PII deletion transactions remain in the set of PII deletion transactions.

In response to a determination that further PII deletion transactions remain in the set of PII deletion transactions at 1140, process 1100 returns to 1130 and process 1100 iterates through 1130 and 1140 until the set of PII deletion transactions is committed with respect to the reconstructed dataset.

In response to a determination that no further PII deletion transactions remain in the set of PII deletion transactions at 1140, process 1100 proceeds to 1145.

At 1145, a determination is made as to whether process 1100 is complete. In some embodiments, process 1100 is determined to be complete in response to a determination that no further PII deletion transactions are included in the audit log since a date corresponding to the earlier version of the dataset, a user has indicated that no further PII deletion transactions are to be committed with respect to the reconstructed dataset, no further datasets are to be restored (e.g., recovered), the user has exited the system, an administrator indicates that process 1100 is to be paused or stopped, etc. In response to a determination that process 1100 is complete, process 1100 ends. In response to a determination that process 1100 is not complete, process 1100 returns to 1105.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
obtain information to be stored in an element of a dataset;
determine whether the information being stored in the element of the dataset is personal identifiable information (PII) data using a client PII flag associated with the element; and
in response to a determination that the information is PII data:
restrict storing the PII data until a PII key associated with the PII data is obtained, wherein the PII key comprises a unique identifier for an individual associated with the PII data;
obtain the PII key; and
in response to obtaining the PII key, store, in the dataset, the PII data and the PII key; and
a memory coupled to the one or more processors and configured to provide the one or more processors with instructions.

2. The system of claim 1, wherein the PII key is created for specifically referencing the PII data.

3. The system of claim 1, wherein the one or more processors is further configured to store additional information pertaining to the PII key.

4. The system of claim 3, wherein:
the PII data is stored in association with at least two identifiers; and
the at least two identifiers comprise a PII key identifier and a record identifier of the PII data that is stored.

5. The system of claim 4, wherein the record identifier identifies a row of the dataset in which a record for the PII data is stored.

6. The system of claim 4, wherein the PII key identifier is created for association with the PII data, and the record identifier is created based at least in part on a data model corresponding to the dataset.

7. The system of claim 1, wherein the PII key is obtained contemporaneous with receiving a request to store the PII data in the dataset.

8. The system of claim 1, wherein:
the dataset comprises one or more data records;
the one or more data records respectively comprise at least three fields:
a first field storing the corresponding data record that is designated for storing PII;
a second field in which the information pertaining to the PII key is stored; and
a third field corresponding to a third field flag that indicates whether the corresponding data record currently stores PII.

9. The system of claim 8, wherein the third field flag is automatically set to indicate that the data record stores PII in response to a determination that PII is comprised in the data record.

10. The system of claim 8, wherein the one or more processors are further configured to:
receive a request to store information with respect to a data record;
determine whether the third field corresponding to the data record indicates that the data record is designated as storing PII; and
in response to determining that the first field indicates that the data record is designated as storing PII, ensure that information pertaining to the PII key is comprised in the second field.

11. The system of claim 10, wherein ensuring that information pertaining to the PII key is comprised in the second field comprises:
restricting storing of the data record until the second field comprises information pertaining to the PII key.

12. The system of claim 10, wherein ensuring that information pertaining to the PII key is comprised in the second field comprises:
causing the PII key associated with the information to be stored in connection with the data record to be obtained.

13. The system of claim 12, wherein the causing the PII key associated with the information to be stored in connection with the data record to be obtained comprises:
forcing an entity storing the information with respect to the data record to provide a corresponding PII key for which corresponding information is to be stored in the second field.

14. The system of claim 8, wherein the second field is used to store information pertaining to a plurality of PII keys in response to a determination that the information for the corresponding data record is associated with a plurality of individuals.

15. The system of claim 8, wherein a value for a third field is preset based at least in part on a data model of the dataset.

16. The system of claim 1, wherein the PII data stored in the dataset is stored in an encrypted state, and the PII data is encrypted with an encryption key.

17. The system of claim 16, wherein the encryption key is different from the PII key.

18. The system of claim 1, wherein the PII data is stored in a first field of a record of the dataset and the PII key is stored in a second field of the record of the dataset, wherein the second field is associated with the first field.

19. The system of claim 18, wherein storing further comprises storing a PII flag associated with the PII data, wherein the PII flag is stored in a third field of the record of the dataset, wherein the third field is associated with the first field, and wherein the PII flag indicates whether the first field currently stores PII.

20. A method, comprising:
obtaining, by one or more processors, information to be stored in an element of a dataset;
determining whether the information being stored in the element of the dataset is personal identifiable information (PII) data using a client PII flag associated with the element; and
in response to a determination that the information is PII data:
restricting storing the PII data until a PII key associated with the PII data is obtained, wherein the PII key comprises a unique identifier for an individual associated with the PII data;
obtaining the PII key; and
in response to obtaining the PII key, storing, in the dataset, the data and the PII key.

21. A computer program product embodied in a non-transitory computer readable medium and comprising computer instructions for:
obtaining, by one or more processors, information to be stored in an element of a dataset;
determining whether the information being stored in the element of the dataset is personal identifiable information (PII) data using a client PII flag associated with the element; and in response to a determination that the information is PII data:
  restricting storing the PII data until a PII key associated with the PII data is obtained, wherein the PII key comprises a unique identifier for an individual associated with the PII data;
  obtaining the PII key; and
  in response to obtaining the PII key, storing, in the dataset, the PII data and the PII key.

* * * * *